United States Patent
Ju et al.

(10) Patent No.: US 12,080,143 B2
(45) Date of Patent: Sep. 3, 2024

(54) METHOD AND APPARATUS FOR PROVIDING LOCATION ALARM SERVICE OF ELECTRONIC DEVICE

(71) Applicant: Samsung Electronics Co., Ltd., Gyeonggi-do (KR)

(72) Inventors: Seungyoun Ju, Gyeonggi-do (KR); Moohyun Shin, Gyeonggi-do (KR); Sungjun Yi, Gyeonggi-do (KR); Seungcheol Lee, Gyeonggi-do (KR); Jinhong Jeong, Gyeonggi-do (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/860,571

(22) Filed: Jul. 8, 2022

(65) Prior Publication Data

US 2022/0343747 A1    Oct. 27, 2022

Related U.S. Application Data

(63) Continuation of application No. PCT/KR2021/010435, filed on Aug. 6, 2021.

(30) Foreign Application Priority Data

Aug. 7, 2020  (KR) .................. 10-2020-0099409
Nov. 26, 2020  (KR) .................. 10-2020-0161439

(51) Int. Cl.
*G08B 25/10*   (2006.01)
*G08B 21/18*   (2006.01)
*H04L 9/32*    (2006.01)

(52) U.S. Cl.
CPC ............ *G08B 21/18* (2013.01); *H04L 9/3228* (2013.01)

(58) Field of Classification Search
None
See application file for complete search history.

(56) References Cited

U.S. PATENT DOCUMENTS

| | | | |
|---|---|---|---|
| 8,536,990 B2* | 9/2013 | Collins, Jr. .......... | A61G 7/0516 340/286.07 |
| 8,981,938 B2* | 3/2015 | H. Kazerouni .... | G08B 21/0269 340/568.1 |

(Continued)

FOREIGN PATENT DOCUMENTS

| KR | 10-2012-0070029 A | 6/2012 |
|---|---|---|
| KR | 10-1191567 B1 | 10/2012 |

(Continued)

OTHER PUBLICATIONS

The European search report for EP Application No. 21853646.4 mailed on Apr. 3, 2024.

*Primary Examiner* — Daniel Previl
(74) *Attorney, Agent, or Firm* — CANTOR COLBURN LLP

(57) ABSTRACT

An electronic device and method are disclosed. The electronic device includes a location detection circuit, a first wireless communication circuit configured to support short-range communication, a second wireless communication circuit, and at least one processor. The processor implements the method, including: receiving an advertising packet from an external device using the first wireless communication circuit, the advertising packet including identification information for the external device, acquiring a location of the electronic device using the location detection circuit, transmitting a first signal including the identification information of the external device and the acquired location to a server, using the second wireless communication circuit, receiving a second signal responsive to the first signal from the server via the second wireless communication circuit, the second (Continued)

signal including an alarm command for the external device, and transmitting the alarm command to the external device using the first wireless communication circuit.

21 Claims, 15 Drawing Sheets

(56) References Cited

U.S. PATENT DOCUMENTS

| | | | |
|---|---|---|---|
| 11,240,350 B1* | 2/2022 | Lind | H04L 51/04 |
| 2005/0102703 A1* | 5/2005 | Querashi | H04N 21/8113 |
| | | | 348/E7.071 |
| 2015/0026580 A1* | 1/2015 | Kang | H04W 12/04 |
| | | | 455/39 |
| 2016/0080921 A1* | 3/2016 | Yadav | H04W 4/023 |
| | | | 455/456.2 |
| 2017/0164156 A1 | 6/2017 | Evans et al. | |
| 2018/0225951 A1* | 8/2018 | de Barros Chapiewski | |
| | | | G08B 13/1427 |
| 2018/0324569 A1 | 11/2018 | Ossin et al. | |

FOREIGN PATENT DOCUMENTS

| | | |
|---|---|---|
| KR | 10-2014-0086321 A | 7/2014 |
| KR | 10-2015-0120189 A | 10/2015 |

* cited by examiner

METHOD AND APPARATUS FOR PROVIDING LOCATION ALARM SERVICE OF ELECTRONIC DEVICE

CROSS-REFERENCE TO RELATED APPLICATION(S)

This application is a continuation of International Application No. PCT/KR2021/010435, filed on Aug. 6, 2021, which claims priority to Korean Patent Application No. 10-2020-0099409, filed on Aug. 7, 2020 and No. 10-2020-0161439, filed on Nov. 26, 2020 in the Korean Intellectual Property Office, the disclosures of which are herein incorporated by reference.

TECHNICAL FIELD

Various embodiments of the disclosure relate to technology for providing a location alarm service of an electronic device.

BACKGROUND

As various electronic products are increasingly widespread in recent years, users generally own a plurality of electronic devices connectable to a smart phone, such as smart watches, earphones, tablets, in addition to mobile communication devices such as smartphones. Smaller electronic devices, such as earphones, are often at risk of loss due to user carelessness. Accordingly, manufacturers and/or service providers sometimes provide location identifying services for electronic devices, in case the electronic device is lost.

However, location identification services may be used to track and spy on personal location, contrary to its original purpose. For example, malicious attacker may attach or mount a small electronic device to another's possessions or vehicles, enabling tracking of the location via the small electronic device. Accordingly, when the mounting of the small electronic device is not noticed, people may be tracked without being aware of it. Thus, there is a problem of intrusion upon personal privacy.

In a location identification service for identifying a location of an electronic device disposed at an unknown location, another electronic device may receive a signal generated from the electronic device, and then provide location information to a predetermined server. The predetermined server is normally operated by a manufacturer of the electronic device, and corresponding location services typically come preinstalled in the electronic device during manufacture by the corresponding manufacturer.

However, the location identification service of the electronic device may be at risk of being misused by a malicious attacker intent on secretly tracking the location of the other electronic device or the location of the user of the other electronic device. For example, the attacker may secretly place a small electronic device in the belongings or the pocket of the user, by which they may continuously receive a location of the user from the server. The user may have difficulty in recognizing this. In addition, even when the user recognizes the existence of an electronic device tracking user's location, it is difficult to easily and quickly identify the exact location of the electronic device.

SUMMARY

Accordingly, various embodiments of the disclosure may provide various embodiments for providing a location alarm service, in which a user who is being location-tracked by a surreptitious electronic device may quickly identify the existence and exact location of the tracking electronic device.

The technical object to be achieved by embodiments of the disclosure is not limited to that mentioned above, and other technical objects that are not mentioned above may be clearly understood to those skilled in the art based on the description provided below.

An electronic device according to an embodiment of the disclosure includes a location detection circuit, a first wireless communication circuit configured to support short-range communication, a second wireless communication circuit, and at least one processor electrically connected with the location detection circuit, the first wireless communication circuit, and the second wireless communication circuit. The processor is configured to: receive an advertising packet from an external device using the first wireless communication circuit, the advertising packet including identification information for the external device, acquire a location of the electronic device using the location detection circuit, transmit a first signal including the identification information of the external device and the acquired location to a server, using the second wireless communication circuit, receive a second signal responsive to the first signal from the server via the second wireless communication circuit, the second signal including an alarm command for the external device, and transmit the alarm command to the external device using the first wireless communication circuit.

An operating method of an electronic device according to an embodiment of the disclosure includes: receiving an advertising packet from an external device using a first wireless communication circuit, the advertising packet including identification information of the external device, acquiring location information of the electronic device using a location detection circuit, transmitting a first signal including the identification information of the external device and the location information to a server, using a second wireless communication circuit of the electronic device, receiving a second signal responsive to the first signal from the server via the second wireless communication circuit, the second signal including an alarm command for the external device, and transmitting the alarm command corresponding to the second signal to the external device using the first wireless communication circuit.

An electronic device according to an embodiment of the disclosure includes: one or more memory modules, at least one sensor, a first wireless communication circuit and a second wireless communication circuit configured to support communication with a heterogenous network, and at least one processor electrically connected with the one or more memory modules, the at least one sensor, the first wireless communication circuit and the second wireless communication circuit, wherein the one or more memory modules stores instructions that, when executed, cause the at least one processor to: receive an advertising packet including identification information of an external device from the external device, and to control the first wireless communication circuit to transmit alarm information to the external device, control the at least one sensor to acquire location information of the electronic device, and control the second wireless communication circuit to transmit a first signal including the identification information of the external device and the location information to a server, and to control the second wireless communication circuit to receive a second signal including an alarm command regarding the external device from the server in response to the first signal.

According to various embodiments of the disclosure, an alarm may be generated in an electronic device by remote command. Thus, the user may quickly search and locate the electronic device. In addition, when a location identification service for an illicitly placed electronic device is being abused (e.g., as a spy tracker), the existence and exact location of the abusive device may be transmitted to another nearby electronic device to stop the illicit usage.

In addition, there are various effects that can be directly or indirectly understood through the disclosure.

BRIEF DESCRIPTION OF DRAWINGS

With regard to the description of the drawings, the same or similar reference numerals may be used to refer to the same or similar elements.

DETAILED DESCRIPTION

Hereinafter, various embodiments of the disclosure will be described with reference to the accompanying drawings. This is not intended to limit various embodiments of the disclosure to particular forms, and should be interpreted as including various modifications, equivalents, and/or alternatives of the disclosure.

Figure 1:
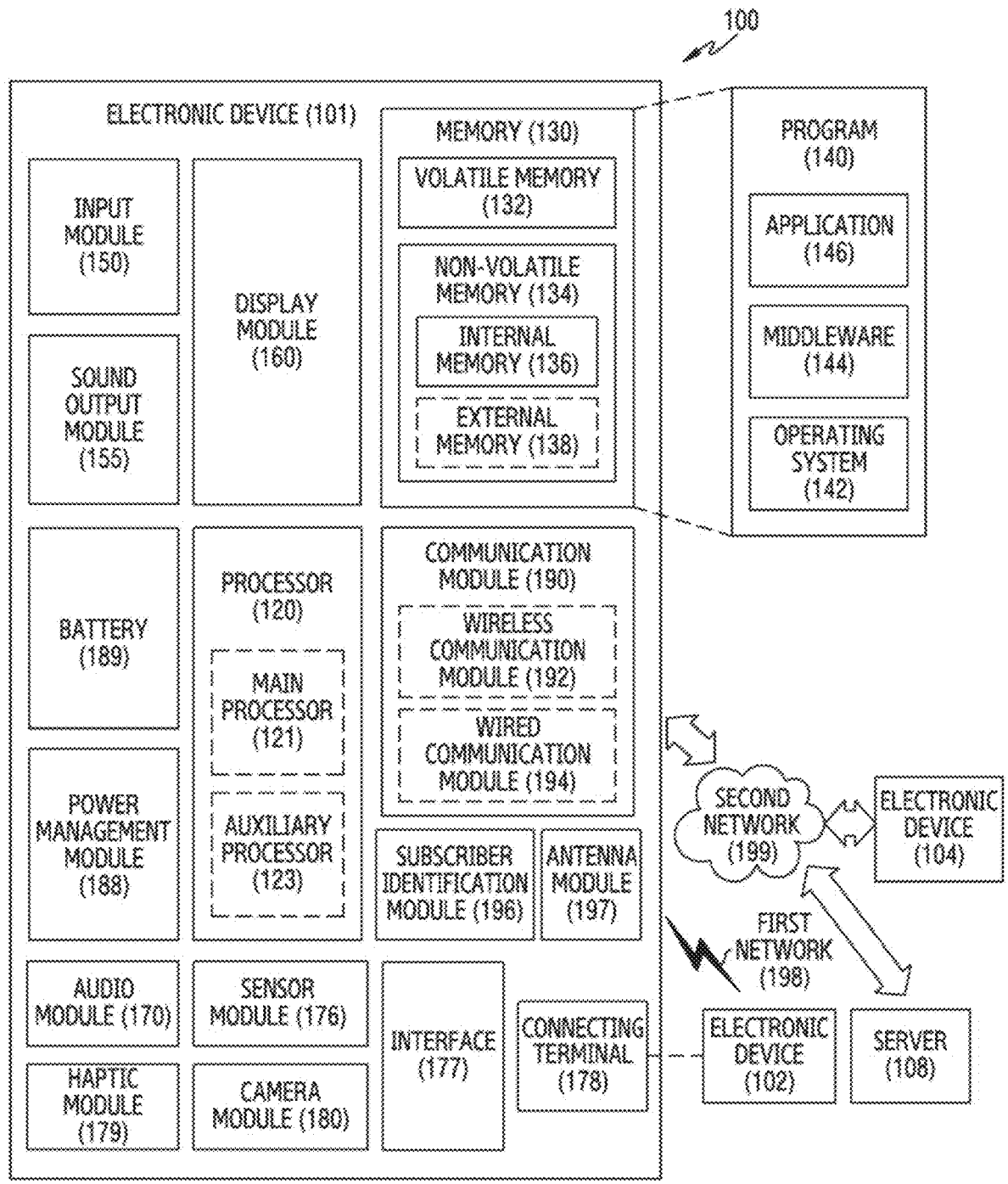
FIG. 1 is a block diagram of an electronic device in a network environment according to an embodiment.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
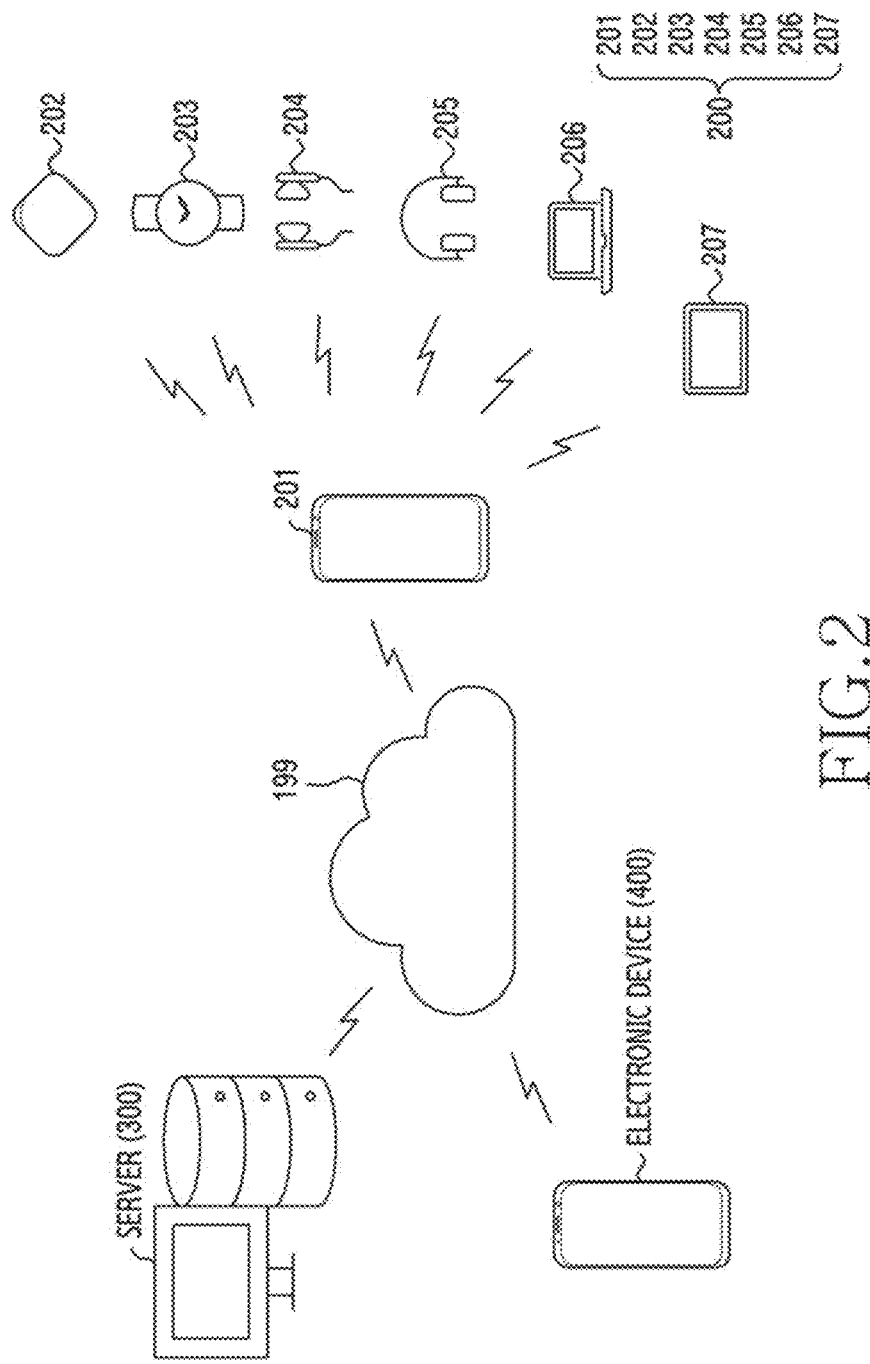
FIG. 2 is a view illustrating a system for identifying a location of a user device according to an embodiment.

FIG. 2 illustrates a system for identifying a location of a user device according to an embodiment.

Referring to FIG. 2, the system according to an embodiment may include user devices 200, a server 300, and an electronic device 400. At least one device of the electronic device 400 and the user devices 200 may be connected with the server 300 through a second network 199 (for example, Wi-Fi or a cellular network).

In an embodiment, the user devices 200 may include a plurality of devices. For example, a certain user may own at least one more device from among a second device 202, a third device 203, a fourth device 204, a fifth device 205, a sixth device 206, or a seventh device 207, in addition to a first device 201 which is mainly used. The first device 201 may be a mobile communication device such as a smartphone. The second device 202 may be a tag device that is small and thus easily concealable, and may have a shape of a small size object such as a key, a button, or may be manufactured to be mountable in another electronic device or object. The third device 203 may be a wearable device like a smart watch. The fourth device 204 may be a wireless earphone like earbuds. The fifth device 205 may be a Bluetooth headphone or a headset. The sixth device 206 may be a notebook computer. The seventh device 207 may be a tablet. In addition to the devices illustrated in FIG. 2, the user may use other appropriate devices by interoperate them with the first device 201. For example, if a key fob, a wallet, a backpack, a dog or cat recognition device, a car, a bike, an identification card, a briefcase, an umbrella, and/or other devices (gear) satisfy a communication function described in various embodiments of the disclosure, they may be a device that can interoperate with the first device 201. The first device 201 may track a location of a paired device when desired (for example, when the device is lost). In addition, in a certain embodiment, a user may use two or more of the same kind of devices. For example, the user may use a plurality of smartphones (for example, the first device 201) by pairing them with each other. In addition, the user may use two or more tablets (for example, the seventh devices 207) by pairing them with the first device 201.

In an embodiment, the user devices 200 may be interconnected by using one or a plurality of communication protocols. For example, the first device 201 may be connected with at least one of the second device 202, the third device 203, the fourth device 204, the fifth device 205, the sixth device 206, or the seventh device 207 through a short-range network. For example, a network (for example, a short-range network) for establishing a connection between the user devices 200 may be appropriately selected. For example, along with or instead of Bluetooth, Bluetooth low energy (BLE), Wi-Fi direct, near field communication (NFC), ultra-wide band (UWB) communication or infrared communication may be used to establish a connection between the user devices 200. In addition, in an embodiment, the user devices 200 may establish a connection by using a mesh network (for example, Zigbee or Z-Wave) as short-range wireless communication.

In an embodiment, the user devices 200 may be connected with one another in different methods according to device information (for example, a device configuration element). For example, when at least one of the user devices 200 is an IP-based (IP address) device, the device may establish a connection with the second network 199 by using a service set identifier (SSID), and, when the device is not the IP-based device (for example, BLE, Zigbee, or Z-wave), the device may establish a connection with the second network 199 by using a user device (for example, the first device 201) or a hub device (not shown).

In an embodiment, at least one of the user devices 200 may broadcast an advertising packet to provide a finding function when the device is lost. For example, when the second device 202 determines that it is lost, the second device 202 may broadcast a variety of information including identification information thereof (second device 202) by using a packet. The packet may be broadcasted to be received by one or a plurality of electronic devices located within a predetermined communicable distance, in addition to the second device 202. In various embodiments of the disclosure, a packet or an advertising packet may be understood as a signal, a message or a beacon for recognizing that a device is lost.

In an embodiment, at least one of the user devices 200 may determine whether it is lost according to various criteria. For example, when a first time (for example, 15 minutes) is elapsed from the last time the second device 202 is connected with the first device 201, which is a mother terminal or a main terminal, the second device 202 may determine that the second device 202 enters an offline state in which the connection with the first device 201 is broken. For example, when a second time (for example, 24 hours) is further elapsed after the second device 202 enters the offline state, the second device 202 may determine that it is lost. According to various embodiments, in determining whether the second device 202 is lost, the second device 202 may additionally consider a remaining capacity of a battery besides a time. In this case, the remaining capacity of the battery may be a remaining capacity of the battery of the second device 202, and the time may be the first time (for example, 15 minutes) and the second time (for example, 24 hours). The first time, the second time and/or the remaining capacity of the battery may be applied as various loss determining criteria according to user settings or criteria of a manufacturer.

In various embodiments, descriptions of the electronic device 101 in FIG. 1 may be appropriately applied to the user devices 200. For example, when the first device 201 of the user is a smartphone, the first device 201 and the electronic device 101 may be the same device. In addition, when the fourth device 204 of the user is earbuds without a display, descriptions of the electronic device 101 except for the description of the display module 160 may be appropriately applied to the fourth device 204.

In an embodiment, the server 300 may correspond to the server 108 of FIG. 1. When at least one of the devices 202, 203, 204, 205, 206, 207, except for the first device 201, is lost, the server 300 may provide a function of identifying a location of the at least one lost device. In various embodiments disclosed in the disclosure, an example in which, when the second device 202 is lost from among the user devices 200, the first device 201 identifies a location of the lost second device 202 will be described.

In an embodiment, the electronic device 400 may be a device of another user who is different from the owner of the second device 202. The electronic device 400 may be in the proximity of the second device 202 and may directly or indirectly acquire an advertising packet broadcasted from the second device 202. The electronic device 400 may include a short-range communication circuit for receiving a signal broadcasted by the second device 202 by using a short-range communication technique (for example, BLE). In addition, the electronic device 400 may include a location measurement circuit (for example, a GPS circuit) to measure its own location. In addition, the electronic device 400 may include a long-range communication circuit (for example, a communication circuit supporting a cellular network and/or a Wi-Fi network) to transmit information on the second device 202 and its own location to the server 300.

In an embodiment, the electronic device 400 may be the same kind of device (for example, a smartphone) as the first device 201. A part or entirety of descriptions of the electronic device 101 described with reference to FIG. 1 may be applied to the electronic device 400. In addition, descriptions of a configuration or function of the first device 201 in various embodiment of the disclosure may be applied to the electronic device 400, but this should not be considered as limiting. The electronic device 400 may be a certain electronic device that supports the above-described communication function.

Figure 3:
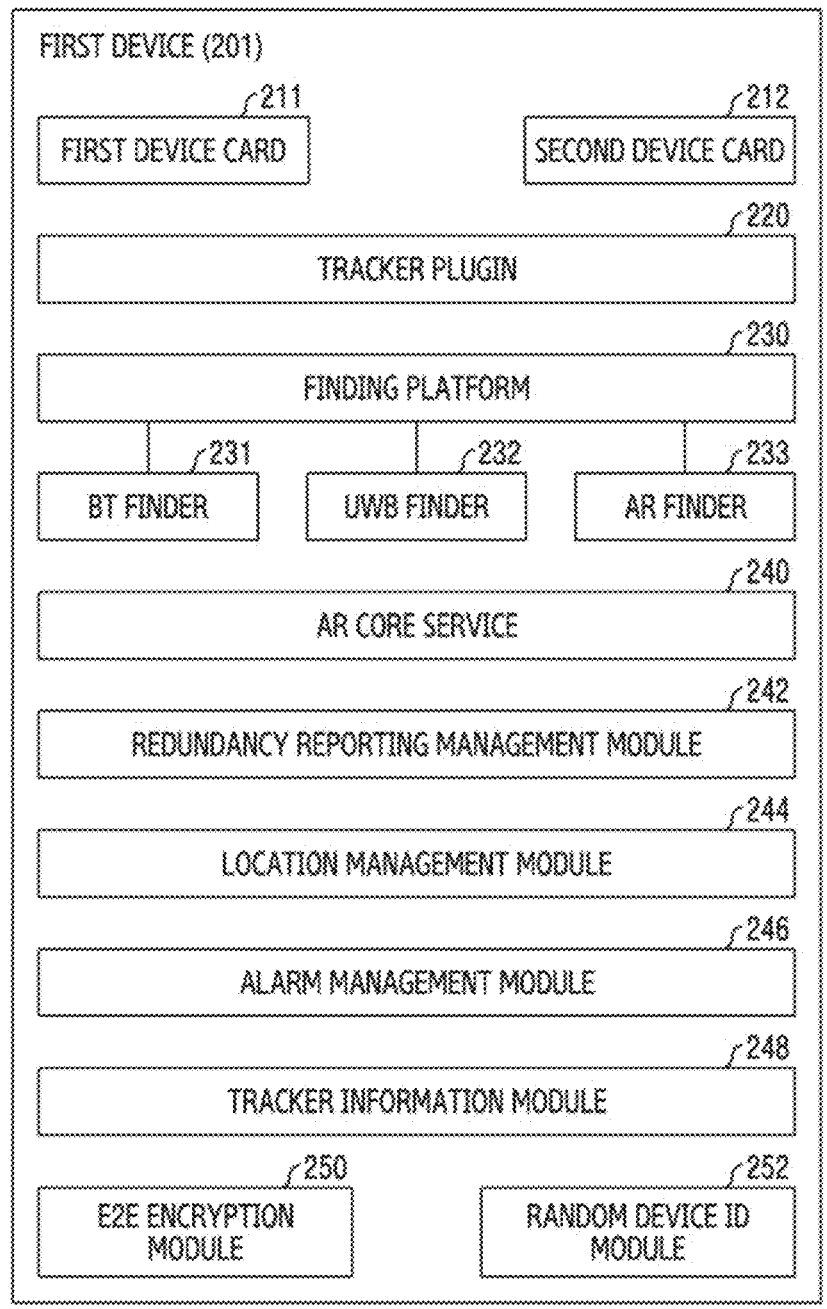
FIG. 3 is a view illustrating example modules related to various functions of an electronic device according to an embodiment.

FIG. 3 illustrates modules related to various functions of an electronic device according to an embodiment.

Various functions explained in FIG. 3 may be understood as functions that are supported by the first device 201 and facilitate finding the second device 202. In addition, various functions explained in FIG. 3 may be understood as functions that are supported by the electronic device 400 for processing an advertising packet acquired from the second device 202. As described above, the first device 201 and the electronic device 400 may be distinguished according to whether the device actively finds the second device 202 or provides help in finding the second device 202. The functions described in FIG. 3 may be provided in both the first device 201 and the electronic device 400. Hereinafter, descriptions will be made with reference to the first device 201.

The functions or operations described with reference to FIG. 3 may be understood as functions performed by a processor of the first device 201. The processor may execute instructions stored in a memory to implement a software module shown in FIG. 3, and may control hardware (for example, the communication module 190 of FIG. 1) related to the functions.

In an embodiment, the first device 201 may manage at least one device card. For example, a first device card 211 regarding the first device 201 may be registered at the first device 201. In addition, a second device card 212 regarding the second device 202 which has a history of having pairing with the first device 201 may be registered at the first device 201. The device card (for example, the first device card 211, the second device card 212) may include information such as a name and/or identification information of a device, a state of the device, battery information of the device, a location history of the device and/or a current location of the device, or a message related to the device. In an embodiment, the information included in the first device card 211 and/or the second device card 212 may be set and/or changed by a user. For example, the user of the first device 201 and/or the second device 202 may set a name related to the first device 201 and/or the second device 202, a device type, or policy information.

In an embodiment, the first device 201 and the second device 202 may share the same user account. In this case, the first device card 211 and the second device card 212 may be registered to the same user account. For example, when an input requesting identification of a location of a device paired with the first device 201 is received by the user of the first device 201, the first device 201 may output a user interface (UI) including information on the first device card 211 and the second device card 212 that is stored in the memory, through a display (for example, the display module 160 of FIG. 1). An example UI will be described below with reference to FIG. 7.

In an embodiment, the user account of the first device 201 may be different from the user account of the second device 202. In this case, when the first device 210 and the second device 202 have different user accounts and nevertheless identify mutually recognized trust, the first device card 211 and the second device card 212 may be registered to the same user account. For example, when it is identified that a first user of the first device 201 and a second user of the second device 202 are family members, information on the second device 202 may be identified through a first user account of the first user of the first device 201. Hereinafter, descriptions will be made with reference to the same user for convenience, but various embodiments may be applied when the users of the first device 201 and the second device 202 are different.

In an embodiment, a tracker plugin 220 may include a module for registering a user device. For example, the first device 201 may drive operation the tracker plugin 220. The tracker plugin 220 may provide an easy setup pop protocol, or may provide registration by QR code (e.g., QR triggering), or via manual onboarding. For example, the user may register the second device 202 at the server 300 by associating it with the user account, photographing a QR code attached to one surface of the second device 202 or a product case by using a camera (for example, the camera module 180 of FIG. 1) mounted in the first device 201.

In an embodiment, a finding platform 230 may perform a function of finding an electronic device which is lost. The finding platform may control hardware to effectively search for and discover a lost electronic device, according to a distance to the electronic device. For example, the finding platform 230 may operate along with a BT finder 231, a UWB finder 232, and/or an AR finder 233. The BT finder 231 may control a Bluetooth communication circuit, the UWB finder 232 may control a UWB communication circuit, and the AR finder 233 may control a display.

In an embodiment, the BT finder 231 may operate when a distance between the first device 210 and the second device 202 is within a first preset distance (for example, about 100 m). The finding platform 230 may control the BT finder 231, and, when the distance between the first device 201 and the second device 202 is within the first distance, the finding platform 230 may receive a packet from the second device 202 using a short-range communication circuit supporting Bluetooth communication and/or BLE communication, or may establish a short-range communication connection with the second device 202.

In an embodiment, the UWB finder 232 may operate when the distance between the first device 201 and the second device 202 is within a second preset distance (for example, about 50 m) which is shorter than the first distance. The finding platform 230 may control the UWB finder 232 to enable a UWB communication circuit which is connected with a plurality of UWB antennas to receive a signal of a UWB channel used for positioning. The finding platform 230 may receive a UWB signal received from the second device 202 using the UWB communication circuit, and may estimate a location of the second device 202, based on an arrival time of a signal received by each of the plurality of UWB antennas, and/or an angle of arrival.

In an embodiment, when the second device 202 is within a certain threshold distance, the AR finder 233 may visually aid a user to find the second device 202 via display of an augmented reality (AR) interface on the display. Herein, the short distance may be substantially the same as the second distance or may be within a third distance which is shorter than the second distance. The finding platform 230 may output image data obtained through a camera to the display, and may control the AR finder 233 to display the location of the second device 202, as identified through the UWB finder 232, on an AR-enabled screen output to the display. In addition, when the first device 201 does not effectively receive the UWB signal from the second device 202 (i.e., for example, when a reception sensitivity is less than or equal to a threshold value), the AR finder 233 may display a guide on the display prompting movement of the first device 201 to place the first device 201 at a posture (angle) appropriate for receiving the UWB signal.

In an embodiment, when the AR finder 233 is activated for operation, an AR core service 240 may also be enabled. The AR core service 240 may control the first device 201 to access a portrait/object recognition database which is stored in the memory, and/or an AR service providing server, in order to strengthen the AR environment.

In an embodiment, the BT finder 231, the UWB finder 232, and/or the AR finder 233 included in the finding platform 230 may operate simultaneously, or may selectively operate (e.g., sequentially) according to a detected distance to the second device 202. For example, when the distance between the first device 201 and the second device 202 is disposed within the second distance (for example, about 50 m), the BT finder 231 and the UWB finder 232 may operate simultaneously, or the UWB finder 232 may be selectively operated instead of the BT finger 231.

In an embodiment, when the first device 201 receives an advertising packet from a certain lost device (for example, the second device 202), a redundancy reporting management module 242 may execute rebroadcasting of the received advertising packet, and/or reporting to the server. The redundancy reporting management module 242 may prevent information on a certain lost device (for example, the second device 202) from being redundantly reported. For example, the redundancy reporting management module 242 may execute reporting to the server/rebroadcasting when the advertising packet received from the second device 202 satisfies a predetermined condition. The operations of reporting to the server and/or rebroadcasting may be omitted by the redundancy reporting management module 242 when the advertising packet received from the second device 202 does not satisfy the predetermined condition. For example, the redundancy reporting management module 242 may operate when the first device 201 performs the role of the electronic device 400 (for example, the role of a device of a user for providing a help in finding a certain lost device (for example, the second device 202)).

In an embodiment, a location management module 244 may manage a current location of the second device 202 and/or a history of location changes, as acquired from the server 300. The location management module 244 may control a location measurement circuit (e.g., a location detection circuit) such as a GPS circuit, included in the first device 201, to identify and/or manage a location of the first device 201. In an embodiment, an alarm management module 246 may manage alarm-related information of the second device 202. The alarm-related information may include an alarm control state acquired from the second device 202 and/or an alarm-related command regarding the second device 202 as acquired from the server 300. For example, when an alarm-related characteristic value is acquired from the second device 202, the alarm management module 246 may identify and manage an alarm control state of the second device 202, based on the acquired alarm-related characteristic value. In another example, when an alarm command regarding the second device 202 is acquired from the server 300, the alarm management module 246 may identify and manage an alarm control state of the second device 202, based on data included in the alarm command.

In an embodiment, a tracker information module 248 may manage a type of the second device 202 and/or identification information of the second device 202. The tracker information module 248 may operate when the first device 201 performs the role of the electronic device 400. For example, the tracker information module 248 may store and/or manage information on the second device 202, including a device type (for example, a smart watch, an earphone, a headphone, or a tablet) of the second device 202, a communication type (for example, whether BLE is supported, whether Bluetooth is supported, whether a cellular network is supported, or whether UWB communication is supported), and/or identification information (for example, a device unique ID, a network identification ID, or a user-defined ID).

In an embodiment, an E2E encryption module 250 may perform end-to-end encryption. The E2E encryption module 250 may operate when the first device 201 performs the role of the electronic device 400. For example, when the electronic device 400 transmits a message including identification information of a lost device and location information of the electronic device 400 to the server in response to an advertising packet being received from a certain lost device (for example, the second device 202), the E2E encryption module 250 may apply an encryption algorithm to the message. When the E2E encryption module 250 encrypts the message by using an encryption key related to the lost device, a device that has a decryption key corresponding to the encryption key of the lost device may acquire location information of the lost device. For example, the electronic device 400 may encrypt a message which includes identification information of the second device 202 and location information of the electronic device 400, with a public key of the second device 202, and may transmit the encrypted message to the server 300. The first device 201 may acquire the encrypted information on the lost second device 202 from the server 300, and then, may decrypt the information with a private key of the second device 202 and may identify the location of the second device 202 (=location of the electronic device 400). For example, the first device 201 may acquire the private key of the second device 202 in the process of registering the second device 202 for the user account, the process of registering at the server 300, or the process of pairing with the second device 202.

In an embodiment, a random device ID module 252 may change an identification ID of a device to a random ID by using a predetermined algorithm. The random device ID module 252 may operate when the first device 201 performs the role of the electronic device 400. When the electronic device 400 receives an advertising packet from the second device 202, the electronic device 400 may change an identification ID of the second device 202 to a random ID, and may transmit a message to the server 300. The first device 201 may identify the ID of the second device 202 from the random ID by using a predetermined algorithm.

Figure 4:
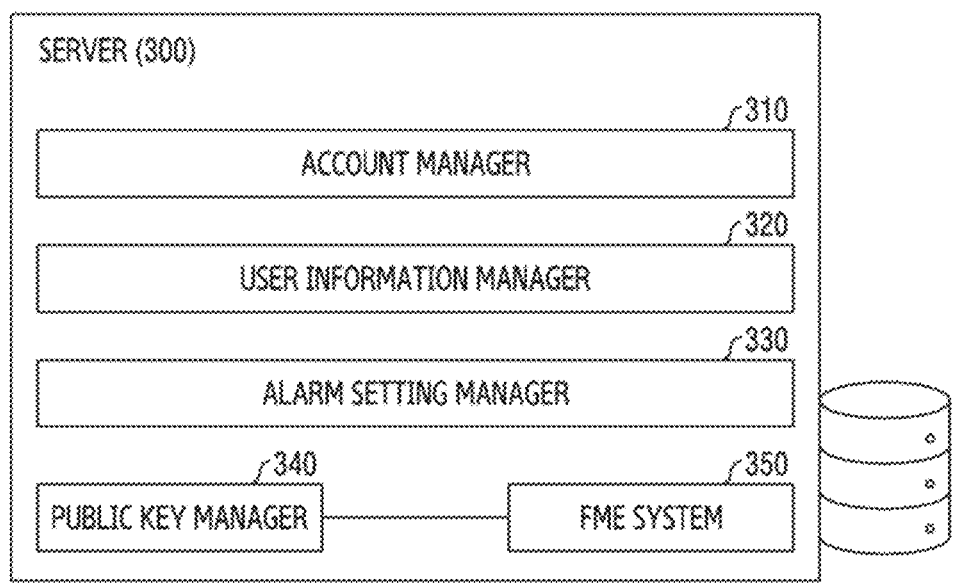
FIG. 4 is a view illustrating example modules related to various functions of a server according to an embodiment.

FIG. 4 illustrates modules related to various functions of a server according to an embodiment.

Referring to FIG. 4, the server 300 may include an account manager 310, a user information manager 320, an alarm setting manager 330, a public key manager 340, and a find my everything (FME) system 350. The elements of the server 300 may be classified from the viewpoint of functions in order to implement various embodiments. The server 300 may be implemented through a plurality of hardware devices (for example, a plurality of processors and a storage device for a server). The server 300 may be understood as a plurality of servers. For example, the server 300 may include a first server for providing an electronic device finding service in a first country, and a second server for providing an electronic device finding service in a second country.

In an embodiment, the server 300 may include the account manager 310. The account manager 310 may manage a user account registered at the server 300 and/or at least one device connected with the user account. For example, when the first device 201, the second device 202, and the third device 203 are registered with a first user account, the account manager 310 may allow the first device 201 to access information on the second device 202 even when a request related to the second device 202 is received from the first device 201, since the first device 201 and the second device 202 are connected to the same first user account.

In an embodiment, the server 300 may include the user information manager 320. The user information manager 320 may manage registration, addition, deletion, and/or modification of user information associated with the user account.

In an embodiment, the server 300 may include the alarm setting manager 330. The alarm setting manager 330 may determine whether to generate an alarm of a lost device (for example, the second device 202). The server 300 may determine that the second device 202 is lost, based on a first signal received from the electronic device 400. The first signal may include identification information and location information of the second device 202. The alarm setting manager 330 may determine to generate an alarm when a designated condition regarding the second device 202 which is lost is satisfied. For example, when a designated time is elapsed after an alarm is generated in the second device 202 and location information is continuously received from the electronic device 400, or when a change in the location of the second device 202 is detected and location information is received from the same electronic device 400, the alarm setting manager 330 may determine to generate an alarm in the second device 202. According to various embodiments, even when location information related to the second device 202 is periodically received from a plurality of electronic devices 400, the alarm setting manager 330 may determine to generate an alarm in the second device 202, and may generate an alarm command to be set for the second device 202 and may forward the alarm command to at least one electronic device 400. In addition, the alarm setting manager 330 may manage alarm-related data which includes a time when an alarm is generated in the second device 202, the number of times the alarm is generated and/or a location.

In an embodiment, the public key manager 340 may manage public keys of devices registered at the server 300. The public key may be managed on a user account basis, or may be managed on a device basis. For example, one public key may be set for one user account. In another example, when five devices are connected with the same user account, five different public keys may be allocated to the five devices, respectively.

In an embodiment, the FME system 350 may perform processing for providing a lost device finding service. For example, when a request for the public key regarding the lost second device 202 is received from the electronic device 400, the FME system 350 may acquire the public key regarding the second device 202 from the public key manager 340, and may provide the acquired public key to the electronic device 400. For example, the FME system 350 may identify the user account at which the second device is registered through the account manager 310. The FME system 350 may identify the user account and/or location information corresponding to the second device 202 through the user information manager 320, and may provide the same to the first device 201 or the electronic device 400.

Figure 5:
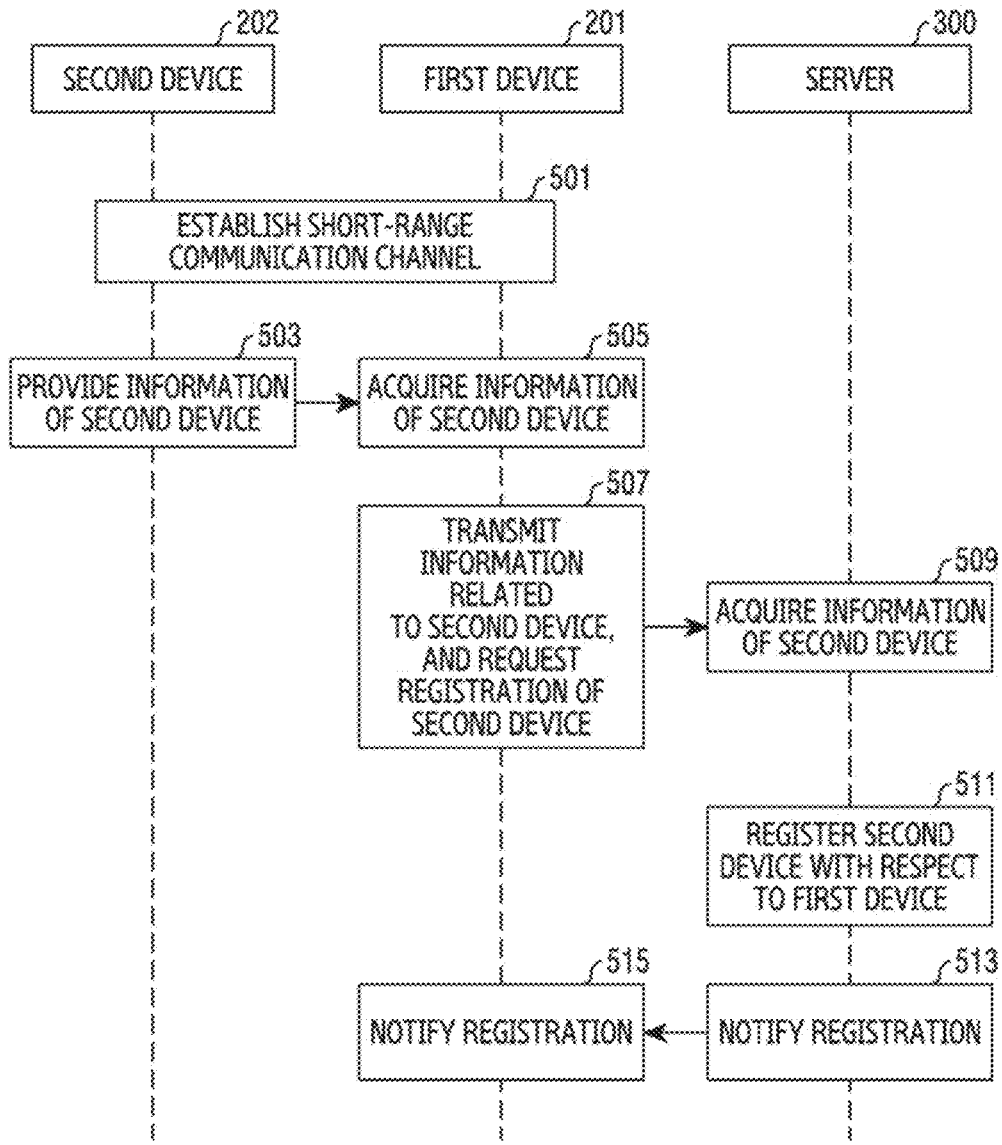
FIG. 5 is a flowchart illustrating an example process of a first device registering a second device at a server according to an embodiment.

FIG. 5 is a flowchart describing an example process in which a first device to registers a second device at a server according to an embodiment.

Referring to FIG. 5, in operation 501, the first device 201 may establish a short-range communication channel with the second device 202. For example, the short-range communication channel may be a device-to-device connection like Bluetooth or Wi-Fi direct, but is not limited thereto.

According to an embodiment, in operation 503, the second device 202 may provide information (e.g., descriptive or identificatory information) of the second device 202 to the first device 201, through the short-range communication channel. The information of the second device 202 may include, for example, a device type (for example, a tag, a smart watch, or a tablet) of the second device 202, unique identification information (for example, a device ID), a manufacturer of the second device 202, hardware information (for example, processor performance, a memory capacity and/or a battery capacity) of the second device 202, software information (for example, a type and a version of an operating system, an installed application, and/or information on whether a device finding service is supported) of the second device 202, and/or information regarding communication performance (for example, whether Bluetooth is supported, whether BLE is supported, whether UWB is supported, whether cellular is supported, whether Wi-Fi is supported, whether NFC is supported, and/or whether MST is supported).

According to an embodiment, in operation 505, the first device 201 may acquire the information of the second device 202. The first device 201 may store the acquired information of the second device 202 in a memory (for example, the memory 130 of FIG. 1) of the first device 201.

According to an embodiment, in operation 507, the first device 201 may transmit the information on the second device 202 to the server 300, and may request the server 300 to register the second device 202. For example, the first device 201 may transmit a message generated according to a predesignated format to the server 300. The message of the predesignated format may include information of the first device 201, user information of the first device 201, a registration request of the second device 202, and/or information of the second device 202. For example, when the first device 201 is registered at a first user account registered at the server 300, the first device 201 may request the server 300 to register the second device 202 at the first user account by transmitting the message to the server 300. In another example, when the first device 201 is registered at the first user account, and the second device 202 is registered at a second user account, and both first and second user accounts are registered with the server 300, the first device 201 may request the server 300 to register the second device 202 using a third user account (for example, a group account) including the first user account and the second user account, and/or may request the server 300 to delete registration information of the second device 202 as pertaining to the second user account, and to register the second device 202 in association with the first user account instead, by transmitting the message to the server 300.

According to an embodiment, in operation 509, the server 300 may acquire the information of the second device 202 from the first device 201. The server 300 may be connected with the first device 201 through a predetermined network (for example, a cellular network or a Wi-Fi network). The server 300 may acquire the information of the second device 202 as transmitted from the first device 201 through the predetermined network.

According to an embodiment, in operation 511, the server 300 may register the second device 202 with respect to the first device 201. For example, the account manager 310 of the server 300 may register the second device 202 with respect to the first user account corresponding to the first device 201, by using the information acquired from the first device 201.

According to an embodiment, in operation 513, the server 300 may transmit a notification indicating that the second device 202 is registered to the first device 201. In operation 515, the first device 201 may receive the registration notification from the server 300.

In an embodiment, operations 501 to 515 may be referred to as a registration procedure, and/or an onboarding procedure of the second device 202. In addition, in an embodiment, the registration procedure or the onboarding procedure may include a procedure for storing identification information (ID) of the second device 202 (for example, a tracker) in the server 300.

When a designated time is elapsed after the second device 202 is disconnected from the first device 201, the second device 202 may recognize that the second device 202 is lost, and may broadcast an advertising packet including its own identification information. These operations will be described below.

Figure 6:
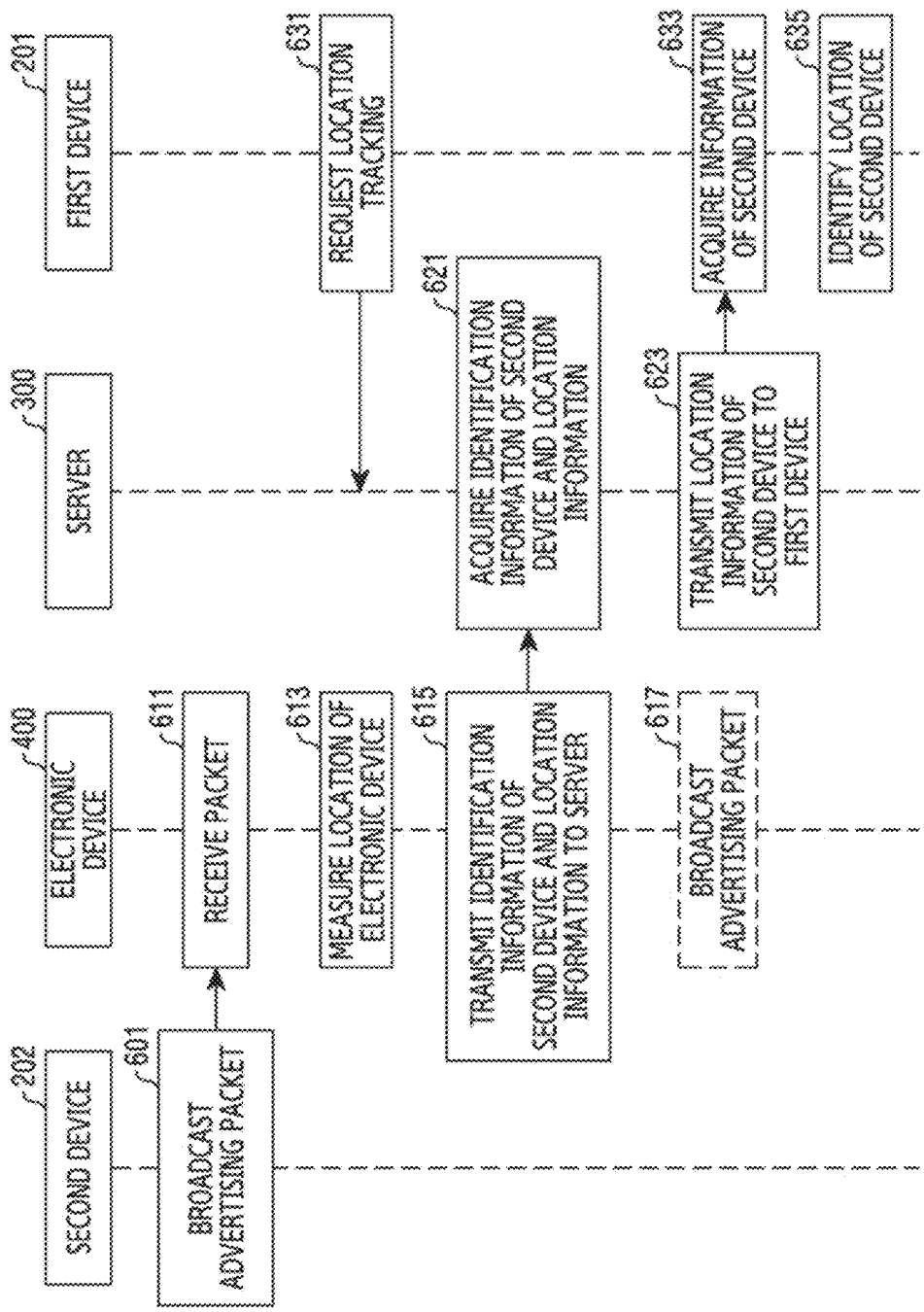
FIG. 6 is a flowchart illustrating an example process of tracking a current location of a second device in a finding system according to an embodiment.

FIG. 6 is a flowchart illustrating an example process of tracking a current location of a second device, within a device-finding system according to an embodiment. For reference, FIG. 6 is descriptive of a state in which the first device 201 and the second device 202 are operative in the system of FIG. 2, and share the same user account, and furthermore that the second device 202 is presently lost. The electronic device 400 may be a certain device that has no association with the user of the first device 201, and may be understood as a device located at a distance in which it is possible to receive a packet broadcasted from the second device 202.

According to an embodiment, in operation 601, the second device 202 may broadcast an advertising packet using a designated communication protocol. The designated communication protocol may correspond to a type of low-power short-range communication protocol to reduce battery consumption. For example, the designated communication protocol may be BLE.

In an embodiment, when the second device 202 detects itself as lost, the second device 202 may broadcast an advertising packet. As described above, there are various conditions for determining that the second device 202 is lost. However, in another embodiment, the second device 202 may broadcast an advertising packet regardless of whether the second device self-detects as lost. For example, the second device 202 may iteratively broadcast the advertising packet at predetermined times (for example, 15 minutes), every predetermined period (for example, 1 hour). In another example, the second device 202 may iteratively broadcast the advertising packet for a predetermined time every a designated time (for example, a user set time).

According to an embodiment, in operation 611, the electronic device 400 may receive an advertising packet broadcasted by an external device. For convenience of explanation, it is assumed that the advertising packet broadcasted by the second device 202 is received. In an embodiment, the electronic device 400 may include various communication circuits. For example, the electronic device 400 may include a first wireless communication circuit for supporting short-range communication to receive an advertising packet. In addition, the electronic device 400 may include a second wireless communication circuit for supporting long-range communication (for example, cellular communication) to communicate with the server 300. In addition, the electronic device 400 may include a location measurement circuit (for example, a GPS circuit) to measure its own location.

The location measurement circuit (i.e., a location detection circuit) may include a positioning system using a base station or an access point (AP) of Wi-Fi or a positioning system using an NFC beacon, in addition to a positioning system using satellite navigation like a GPS system.

In an embodiment, since the advertising packet broadcasted by the second device 202 uses a designated short-range communication protocol, receiving the advertising packet may refer to existence of the second device 202 and the electronic device 400 within a communication distance which is allowed by the short-range communication protocol. For example, when the electronic device 400 receives an advertising packet through BLE, it may be estimated that the electronic device 400 is located within about 100 m from the second device 202 based on the limitations of BLE communication. Accordingly, the location of the electronic device 400 may be regarded as being the same as the location of the second device 202 from the macroscopic viewpoint.

According to an embodiment, in operation 613, the electronic device 400 may estimate a location of the electronic device 400 using the location measurement circuit. The electronic device 400 may identify the location (for example, latitude and/or longitude coordinates) of the electronic device 400, based on the result of estimation. For example, the electronic device 400 may control the location measurement circuit to receive GPS signals from external sources (for example, three or more GPS satellites). The electronic device 400 may identify distance information from the electronic device 400 to the satellites which have transmitted the GPS signals, based on time information included in the respective GPS signals. The electronic device 400 may identify real-time location information of the electronic device 400, based on triangulation of the distance information corresponding to the GPS satellites transmitting the GPS signals.

According to an embodiment, in operation 615, the electronic device 400 may transmit the measured location information and identification information of the second device 202 to the server 300. For example, the electronic device 400 may transmit a message including the identification information (for example, a unique ID and/or a serial number) of the second device 202 and the location information to the server 300 by using the above-described second wireless communication circuit. The electronic device 400 may specify that the location information included in the message indicates location information of the electronic device 400, but may not specify a subject of the location information and may simply include the location information.

According to an embodiment, in operation 617, the electronic device 400 may broadcast an advertising packet after transmitting the message to the server 300. For example, if the advertising packet acquired by the electronic device 400 from the second device 202 may be referred to as a first packet, and the advertising packet rebroadcasted by the electronic device 400 may be referred to as a second packet, the second packet may be substantially the same as the first packet or may include less content (i.e., data). For example, at least some data fields from among a plurality of data fields included in the preset format of the first packet may be omitted from the format of the second packet.

In various embodiments, the electronic device 400 may broadcast the advertising packet before transmitting the message to the server 300 or substantially at the same time as transmitting the message. In addition, operation 617 may just not be performed.

According to an embodiment, in operation 621, the server 300 may acquire the message including the identification information of the second device 202 and the location information from the electronic device 400. When there is a request for tracking a location of the second device 202 from the first device 201 (for example, operation 631) before and/or after the message is acquired, the server 300 may transmit location information of an external device (for example, the second device 202) to the first device 201 in operation 623. For example, in operation 631, the first device 201 may transmit a request for tracking the location (or identifying the location) of the second device 202 to the server 300, and the server 300 may transmit information on the identified location of the second device 202 to the first device 201 in response to the request being received from the first device 201. For example, the server 300 may transmit information on the most recently identified location of the second device 202 to the first device 201.

In an embodiment, in operation 633, the first device 201 may acquire the location information of the second device 202 from the server 300. In operation 635, the first device 201 may identify the location of the second device 202, based on the information acquired from the server 300. Operations 631, 633, and/or 635 may be implemented through an application mounted in the first device 201 to provide a location identification service. This will be described below with reference to FIG. 7.

According to an embodiment, when the server 300 acquires the identification information of the second device 202 and the location information from the electronic device 400 in operation 621, the server 300 may determine whether a location tracking request (for example, operation 631) is received from the first device 201 which registers the second device 202 at the server 300 with the first user account, or from another device having the first user account. For example, when the location tracking request (for example, operation 631) is not received from the first device 201, the server 300 may not perform operation 623. According to an embodiment, the server 300 may transmit a response message to the electronic device 400, based on whether the location tracking request (for example, operation 631) is received from the first device 201, although this is not illustrated. For example, when the location tracking request (for example, operation 631) is received from the first device 201, the server 300 may transmit, to the electronic device 400, a response message informing that the identification information of the second device 202 and the location information are transmitted to the first device 201. In another example, when the location tracking request (for example, operation 631) is not received from the first device 201, the server 300 may request the electronic device 400 not to transmit the identification information of the second device 202 and the location information for a designated time. According to an embodiment, the electronic device 400 may perform the operation (for example, operation 617) of broadcasting the advertising packet, based on the response from the server 300.

Figure 7:
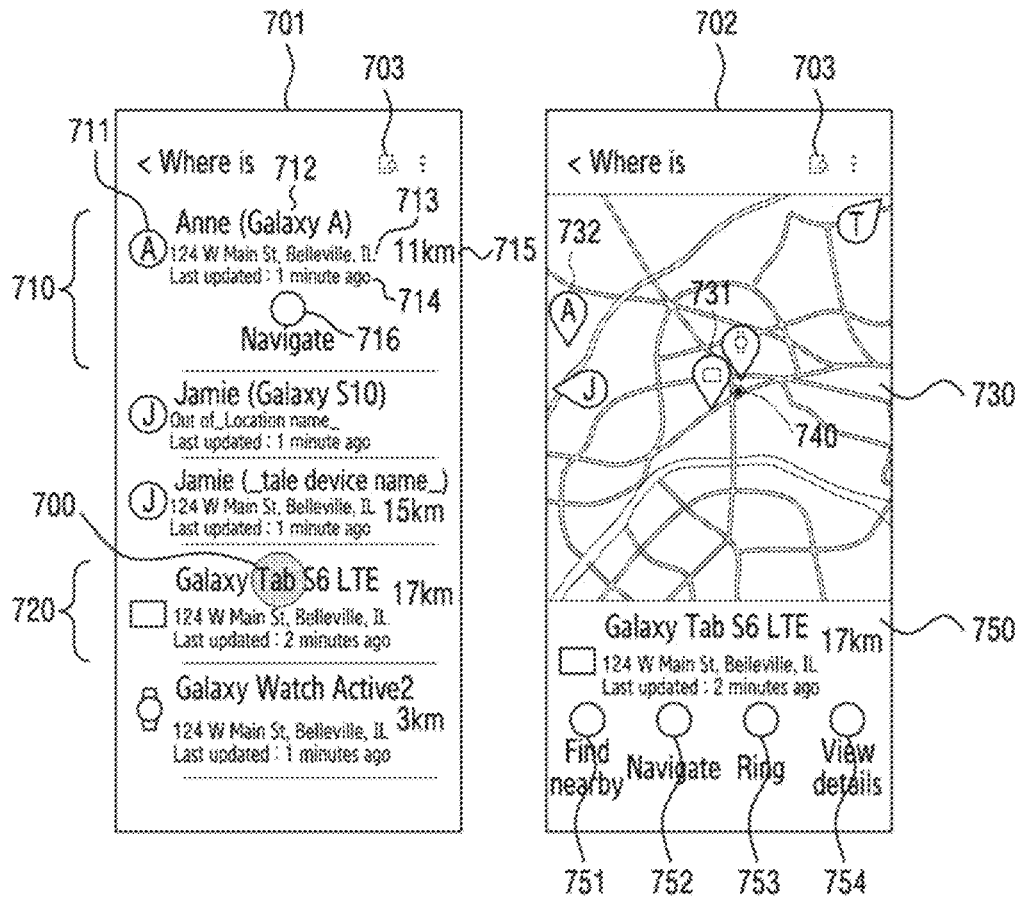
FIG. 7 is a view illustrating an example user interface for identifying locations of user devices in a first device according to an embodiment.

FIG. 7 is a view illustrating an example user interface for identifying locations of user devices in a first device according to an embodiment.

Referring to FIG. 7, a first screen 701 may be an execution screen of an application for providing location identification services of the first device 201. The first device 201 may display information on user devices registered at the first device 201 in the form of a list. According to an embodiment, the first screen 701 may present a list including an item (not shown) corresponding to the first device card 211, and an item corresponding to the second device card 212. For example, the list of the first screen 701 may include a first item 710 corresponding to a smartphone (for example, Galaxy A) indicating the first device 201 registered at the user account of the first device 201, and a second item 720 corresponding to a certain tablet (for example, Galaxy Tab S6 LTE) registered at the user account. In the following description, explanation of the first item 710 and/or the second item 720 may be applied to other items (for example, "Jamie (Galaxy S10)", "Jamie (_table device name_)", and/or "Galaxy Watch Active2") which are not specified on the first screen 701

In an embodiment, each item included in the list may display a variety of information. For example, the first item 710 may include at least one of an icon 711 indicating the smartphone, a nickname (for example, Anne) and a model name 712 (e.g., Galaxy A) of the smartphone, a last identified location 713 (for example, 124 W Main St., Belleville, IL), a last time 714 the location is identified (for example, Last updated: 1 minute ago), a distance 715 from a current location of the first device 201 to the smartphone, a navigation menu 716 for executing a map application or a map function, based on the current location of the first device 201 and the last identified location 713. Some items may be omitted from those described above. For example, when the location of the device is not identified, at least a part of the last identified location 713, the last time 714 that the location is identified, or the navigation menu 716 may not be displayed.

In an embodiment, the first device 201 may automatically perform operation 631 (i.e., of FIG. 6) when the application is executed. In another embodiment, the first device 201 may perform operation 631 by a user input after the application is executed. In still another embodiment, the first device 201 may repeat operation 631 according to a predetermined period (for example, once every 12 hours), and may update locations of the user devices 200 registered with the first device 201.

In an embodiment, when a user input 700 is detected selecting the second item 720 from among various items included in the list, the first device 201 may display a second screen 702 to the display of the first device 201. The second screen 702 may be a UI generated based on a second device card 212.

In an embodiment, the second screen 702 may include a map area 730 and a second device card area 750. For example, the map area 730 may be disposed on an upper portion (area) of the second screen 702, and the second device card area 750 may be disposed on a lower portion (area). However, this is merely an example and the second device card area 750 may be disposed on a different location, divergent from the illustrated example. For example, the second device card area 750 may be provided in the form of floating over a map occupying most of the second screen 702. In addition, the location or size of the second device card area 750 may be moved/magnified/reduced by a user input.

In an embodiment, locations of the user devices 200 identified via the server 300 may be displayed on the map area 730. The locations of the user devices 200 may be displayed in the form of icons. For example, the location of the smartphone corresponding to the first item 710 may be displayed on the map like a first icon 732. In addition, the location of the tablet corresponding to the second item 720 selected by the user input 700 may be displayed on the map like a second icon 731. In an embodiment, the location of the tablet corresponding to the second item 720 selected by the user input 700 may be positioned on a center of the map area 703. In addition, a current location 740 of the first device 201 may be displayed on the map area 730. In an embodiment, the current location 740 of the first device 201 may be positioned on a center of the map area 730.

In an embodiment, the second device card area 750 may include a device action menu 751, a navigation menu 752, a ring menu 753, and/or a view details menu 754.

In an embodiment, when the device action menu 751 is selected, the first device 201 may identify whether the second device 202 (for example, the tablet corresponding to the second item 720) is in the proximity of the first device 201. For example, when the device action menu 751 is selected, the first device 201 may present and/or update the map area 730, based on the location of the first device 201 and location information of the user devices 200 which is received from the server 300. In addition, the first device 201 may discover the existence of the second device 202 in proximity using a designated communication protocol (for example, BLE), in response to the device action menu 751 being selected. When the first device is connected with the second device 202 using the designated communication protocol, the first device 201 may execute the AR finder 233 and may display the location of the second device 202 through an AR interface, or may determine whether to display the same.

In an embodiment, when the navigation menu 752 is selected, the first device 201 may display a route from a present location to the identified location of the second device 202 on the map area 730. In an embodiment, when the ring menu 753 is selected, the first device 201 attempt a phone call to the second device 202, or may transmit a command requesting that the second device 202 output a designated sound. For example, when the second device 202 supports a call function, the first device 201 may try to execute a call to the second device 202 in response to selection of the ring menu 753. In another example, when the second device 202 is connected with the first device 201 through a predetermined short-range communication network, the first device 201 may transmit a designated signal to the second device 202 through the short-range communication network in response to the ring menu 753 being selected. The second device 202 which receives the designated signal may generate a pre-defined ring signal (for example, an alarm, vibration and/or light emission) in response to the designated signal, which may signal its location if the user is nearby.

In an embodiment, when the view details menu 754 is selected, the first device 201 may present detailed information on the second device 202. For example, the first device 201 may display a state of the second device 202 according to various conditions. For example, when the second device 202 is connected to the first device 201 or another device (for example, the fifth device 205 or the sixth device 206) from among the user devices 200, the first device 201 may display a first state message like "Nearby Finding". The message may be displayed in the form of a pop-up or may be displayed in a second device card area 750 of the second device 202. In addition, when the second device 202 is not connected to the first device 202 or another device of the user devices 200, but is not in an "offline finding" state, the first device 201 may display a second state message like "Not in Range Finding". Herein, the "offline finding" state may refer to a state in which it is determined that the second device 202 is lost, a state in which a threshold time is elapsed after the last time the second device 202 is connected with any one of the user devices 200.

In an embodiment, when the second device 202 is not connected to the first device 201 or another device of the user devices 200 and is not in the "offline finding" state, but there is a trial to find the second device 202, the first device 201 may display a third state message like "Lost mode Finding". In addition, when the second device 202 is not connected to the first device 201 or another device of the user devices 200 and is in the "offline finding" state, the first device 201 may display a fourth state message like "Update mode Finding". In addition, when the first device 201 tries to connect to the second device 202, the first device 201 may display a fifth state message like "connecting". In an embodiment, the first to fifth state messages related to the device action menu 751 may be included in the first device card 211 and/or the second device card 212 of FIG. 3.

The above-described first to fifth state messages are examples, and fewer or more state messages may be appropriately set by a manufacturer or a user according to various embodiments. For example, the first device 201 may present battery remaining capacity information of the second device 202. In addition, the first device 201 may display the location (location information) of the second device 202 on a basis of a time stamp. In addition, the first device 201 may display a current state of the second device 202 by using an appropriate message (device card message). For example, the first device 201 may display, on a display, a message indicating whether the second device 202 is in the proximity of the first device 201, whether the second device 202 is in the proximity of another device (for example, the fourth device 204) of the user devices 200, where the last location of the second device 202 is, whether the second device 202 is being found, or whether the second device 202 has been found.

In an embodiment, information presented in the second device card area 750 is not limited to the illustrated examples, and may be presented along with at least one of information related to the device action menu 751 and information (for example, battery remaining capacity information, location information and/or device card message) included in the view details menu 754.

Figure 8:
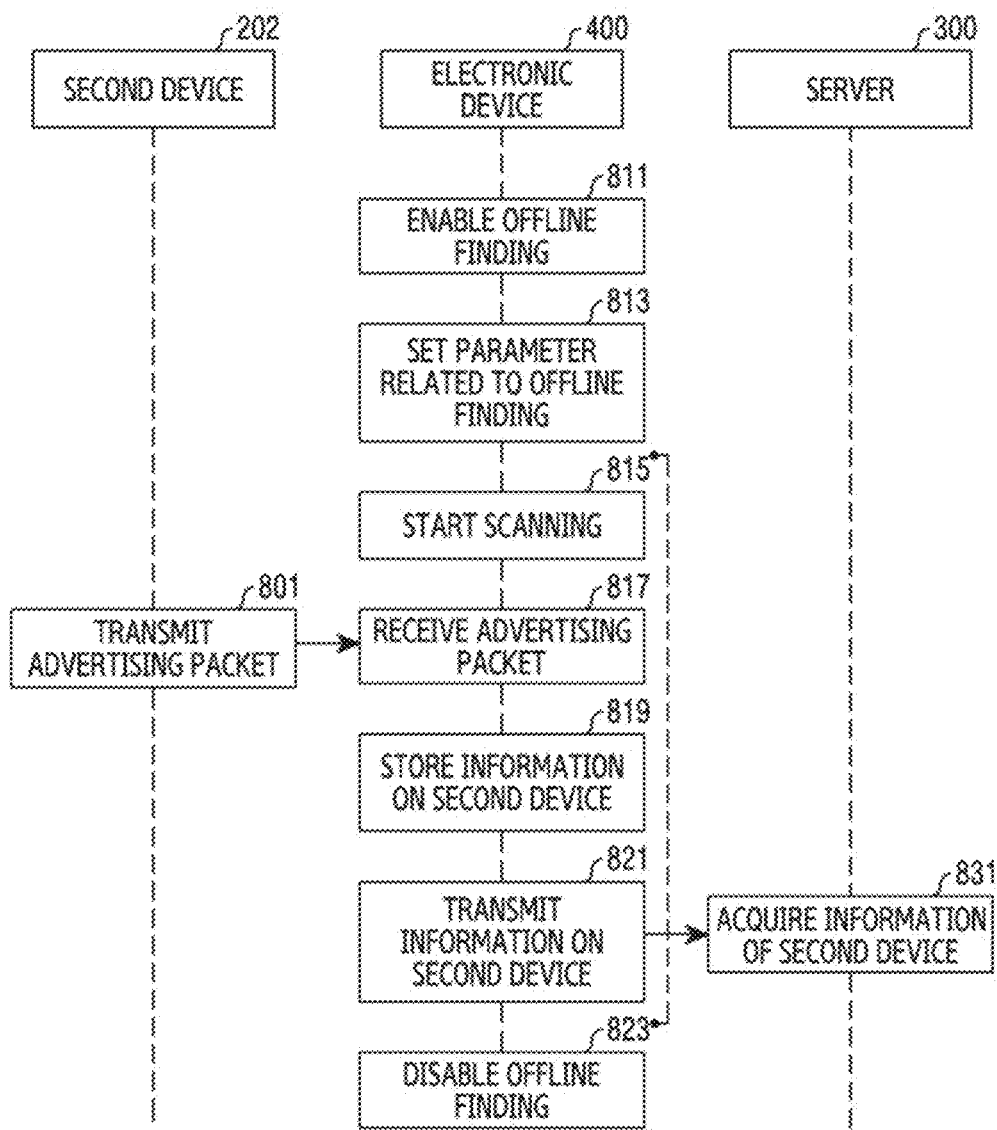
FIG. 8 is a flowchart illustrating an example process of an electronic device scan-searching for a certain external device according to an embodiment.

FIG. 8 is a flowchart for an electronic device to scan to find a certain external device according to an embodiment.

According to an embodiment, in operation 811, the electronic device 400 may enable offline finding. For example, a user of the electronic device 400 may enable an offline finding function in a setup menu. In another example, the offline finding function may be periodically enabled or may be continuously enabled. In still another example, the offline finding function may be enabled during a designated time period (for example, a period from 9 a.m. to 6 p.m.).

According to an embodiment, in operation 813, the electronic device 400 may set parameters related to offline finding function, in response to enabling of the offline finding function. For example, parameters such as a scanning period and a scanning window, a scanning interval, a scanning holding time, and/or a wakeup intent may be set. Herein, the scanning period may refer to a time during which scanning occurs once. The scanning window may refer to a time during which scanning is performed within the scanning period. For example, when the scanning period is 2000 ms and the scanning window is 200 ms, a short-range communication circuit may perform first scanning for 200 ms after wakeup, and may maintains a sleep state for the other time, 1800 ms, and may perform second scanning again for 200 ms when 2000 ms is elapsed after the wakeup.

The scanning holding time may refer to a time for which scanning is held in the above-described scanning period. For example, the electronic device 400 may maintain a scanning pattern in which a scan is performed every 2000 ms for 1 hour. The scanning interval may refer to an interval between the scanning holding times. For example, when the scanning holding time is 1 hour and the scanning interval is 4 hours, the electronic device 400 may maintain scanning for 1 hour from 00 o'clock and maintain the sleep state for 3 hours, and then may maintain scanning for 1 hour from 04 o'clock at which 4 hours are elapsed from 00 o'clock.

According to an embodiment, operation 813 may be omitted. When operation 813 is omitted, the parameters related to the offline finding may be set by a designated setting value (for example, a default value).

According to an embodiment, in operation 815, the electronic device 400 may initiate scanning. Scanning by the electronic device 400 may be performed according to the scanning parameters set in operation 813. The electronic device 400 may acquire, through the first communication circuit supporting short-range communication, an advertising packet broadcast from an external device (for example, the second device 202) while performing scanning.

According to an embodiment, in operation 801, the second device 202 may broadcast an advertising packet by using a designated short-range communication protocol. For example, the second device 202 may broadcast the advertising packet including identification information of the second device 202 at predetermined time intervals by using a BLE protocol.

In an embodiment, the second device 202 may broadcast the advertising packet according to a change of a network state. For example, the second device 202 may determine whether a current network is available. For example, when a network connection between the second device 202 and the server 300 or the first device 201 is lost, the second device 202 may determine whether the network is lost due to an airplane mode. In order to identify a current network state, an application of the second device 202 (for example, an application for providing a location finding service) may reside in the memory of the second device 202. In an embodiment, when the electronic device 202 is not in the airplane mode, the second device 202 may set an alarm, and, when a set alarm time arrives, the second device 202 may broadcast the advertising packet. Thereafter, when the network is recovered (for example, the connection with the first device is recovered), the second device 202 may cancel the set alarm and may stop the operation of broadcasting the advertising packet.

According to an embodiment, in operation 817 after starting scanning, the electronic device 400 may receive an advertising packet from an external device, for example, from the second device 202. In operation 817, the electronic device 400 may acquire information of the second device 202 from the information included in the received advertising packet, and may store the acquired information in the memory of the electronic device 400 in operation 819.

According to an embodiment, in operation 821, the electronic device 400 may transmit the information of the second device 202 to the server 300, based on the information received from the second device 202. The electronic device 400 may include information on the second device 202 and location information. Herein, the location information may indicate a location of the electronic device 400 which is measured by the location measurement circuit of the electronic device 400. In addition, the electronic device 400 may acquire an encryption key for encrypting the information to be transmitted to the server 300, from the server 300, in order to enhance security, and may encrypt the information on the second device 202 with the acquired encryption key and may transmit the encrypted information to the server 300. For example, the electronic device 400 may transmit at least a part of the information on the second device 202 to the server 300, may acquire the encryption key from the server 300, and then may encrypt the information on the second device 202 and/or the location information with the acquired encryption key and may transmit the encrypted information to the server 300.

According to an embodiment, in operation 831, the server 300 may acquire the information of the second device 202 and/or the location information from the electronic device 400, and may provide information on a location of the second device 202 to the first device 201 in response to a request of the first device 201 (for example, operation 623 of FIG. 6).

In an embodiment, the electronic device 400 may repeat operations 815, 817, 819, and/or 821 for a predetermined time, for example, for a scanning holding time, and, when the scanning holding time ends, the electronic device 400 may disable the offline finding function in operation 823. However, in another embodiment, the offline finding function may be disabled by a user input or various events such as a battery remaining capacity state of the electronic device 400.

Figure 9:
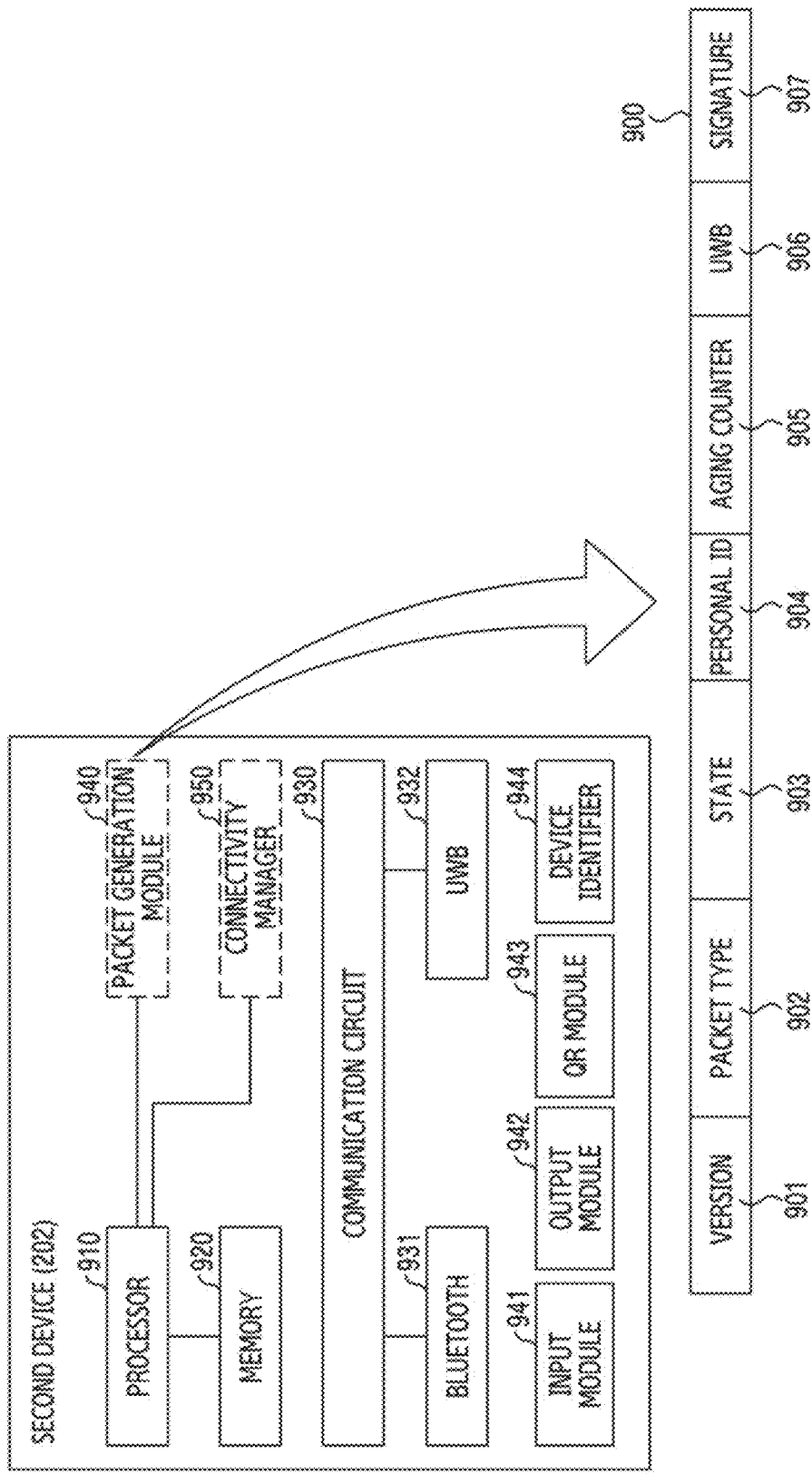
FIG. 9 is a view illustrating an example configuration of a second device and a data structure of a packet which is broadcasted by the second device according to an embodiment.

FIG. 9 illustrates an example configuration of a second device and a data structure of a packet which is broadcasted by the second device according to an embodiment.

Referring to FIG. 9, the second device 202 may include a processor 910, a memory 920, and a communication circuit 930. The elements of the second device 202 illustrated in FIG. 9 are examples and the elements explained with reference to FIG. 1 may be appropriately applied to the second device 202. Explanation of FIG. 1 may be applied to elements of FIG. 9 that correspond to those of FIG. 1.

In an embodiment, the processor 910 may execute an instruction from the memory 920, and may implement a packet generation module 940 and/or a connectivity manager 950. The packet generation module 940 and the connectivity manager 950 may be software modules implemented by executing a program code stored in the memory 920. In addition, in the following description, operations explained as being performed by the packet generation module 940 or the connectivity manager 950 may be understood as being performed by the processor 910.

Referring to FIG. 9, the processor 910 may implement the packet generation module 940 by executing instructions stored in the memory 920. The packet generation module 940 may generate an advertising packet 900 including information on the second device 202. The processor 910 may provide the generated advertising packet 900 to the communication circuit 930 through (by using) the connectivity manager 950, and the communication circuit 930 may broadcast the advertising packet 900 by using a designated protocol. According to certain embodiments, the communication circuit 930 may support a short-range communication protocol of Bluetooth 931 and UWB 932.

In an embodiment, the advertising packet 900 may include version 901, packet type 902, connection state 903, personal ID (privacy ID) 904, aging counter 905, UWB 906, and/or signature 907 fields.

In an embodiment, the version 901 may refer to a version of the advertising packet. Since the advertising packet should be based on a rule that is shared between the second device 202 which broadcasts the advertising packet and the electronic device 400 which receives and interprets the advertising packet, the version that the advertising packet has may be used to determine a rule according to which the electronic device 400 receiving the advertising packet interprets data included in the advertising packet. For example, when the electronic device 400 receives an advertising packet of an old version, not an advertising packet of a recent version, the electronic device 400 may interpret the advertising packet according to a rule corresponding to the old version. In another example, when a version of the electronic device 400 is lower than the version of the advertising packet, the electronic device 400 may update the version through a server (for example, the server 108 of FIG. 1).

In an embodiment, the packet type 902 may indicate whether the advertising packet is for transmitting information or for requesting information. For example, when the second device 202 broadcasts the advertising packet for the purpose of transmitting its own information, the packet type 902 may indicate a normal advertisement. When the second device 202 broadcasts the advertising packet for the purpose of acquiring information from the first device 201 or the server 300, the packet type 902 may be set to indicate a request advertisement.

In an embodiment, the connection state 903 may indicate information regarding whether the second device 202 is in an offline mode (for example, offline finding) or an online mode. When the second device 202 is currently in the online mode, the connection state 903 may indicate that the second device 202 is connected with the first device 201, and may indicate information regarding through which channel the connection is maintained. For example, the connection state 903 may be defined by distinguishing whether a channel that the second device 202 is connecting in the online mode is a normal channel or a reserved channel, or both the two channels. When the second device 202 is currently in the offline mode, the connection state 903 may indicate a state in which the second device 202 is disconnected from the first device 201 (offline state) and may be defined to indicate information regarding how much time is elapsed after the disconnection. For example, the offline mode may be divided into premature offline, offline, and overmature offline according to an elapsed time after the connection of the second device 202 is broken. A criterion for determining the connection state of the second device 202 will be described below with reference to FIG. 10.

In an embodiment, the personal ID 904 may be unique identification information of the second device 202. Additionally and/or alternatively, the personal ID 904 may be a random ID that is generated according to a predetermined algorithm based on the unique identification information of the second device 202. When the personal ID 904 of the second device 202 is not changed, there may be a privacy problem that a location is unintentionally tracked by another nearby device that recognizes the personal ID 904. Therefore, the personal ID 904 may be changed periodically according to a designated time (for example, 15 minutes).

In an embodiment, the aging counter 905 may indicate the number of times that the personal ID 904 is changed after the second device 202 is onboarded. For example, when the second device 202 changes the personal ID 904 every 15 minutes, the aging counter 905 may increase every 15 minutes with reference to an epoch time which is stored at the time of onboarding. Changing of the personal ID 904 and increasing of the aging counter 905 may be performed simultaneously.

In an embodiment, the UWB 906 may indicate whether the second device 202 is a device that supports UWB communication. The advertising packet 900 may further include information indicating whether the second device 202 supports E2E or MCF, in addition to UWB.

In an embodiment, the signature 907 is a digital signature value that is generated by using a unique key of the second device 202, and may indicate whether the corresponding advertising packet is effective. The signature 907 may be calculated in real time every time the advertising packet is transmitted, and may be added to the fields of the advertising packet.

In various embodiments, the second device 202 may further include an input module 941, an output module 942, a QR code 943, and a device identifier 944. In an embodiment, the input module 941 may be used for identifying a user's intent, and may be in the form of a physical button. For example, when an alarm is generated in the second device 202, the user may stop the alarm by clicking a button provided on the second device 202. In an embodiment, the output module 942 may be used for generating an audio signal and may include a device of a buzzer type. In an embodiment, the QR code 943 may be used for easily performing procedures such as identification, registration, and/or onboarding of the second device 202, and may be printed on the second device 202, or may be printed on a separate sticker and may be attached to the second device 202. In an embodiment, the device identifier 944 is identification information uniquely given to the second device 202, and may include a product serial number or a short-range communication MAC address of the second device 202.

Figure 10:
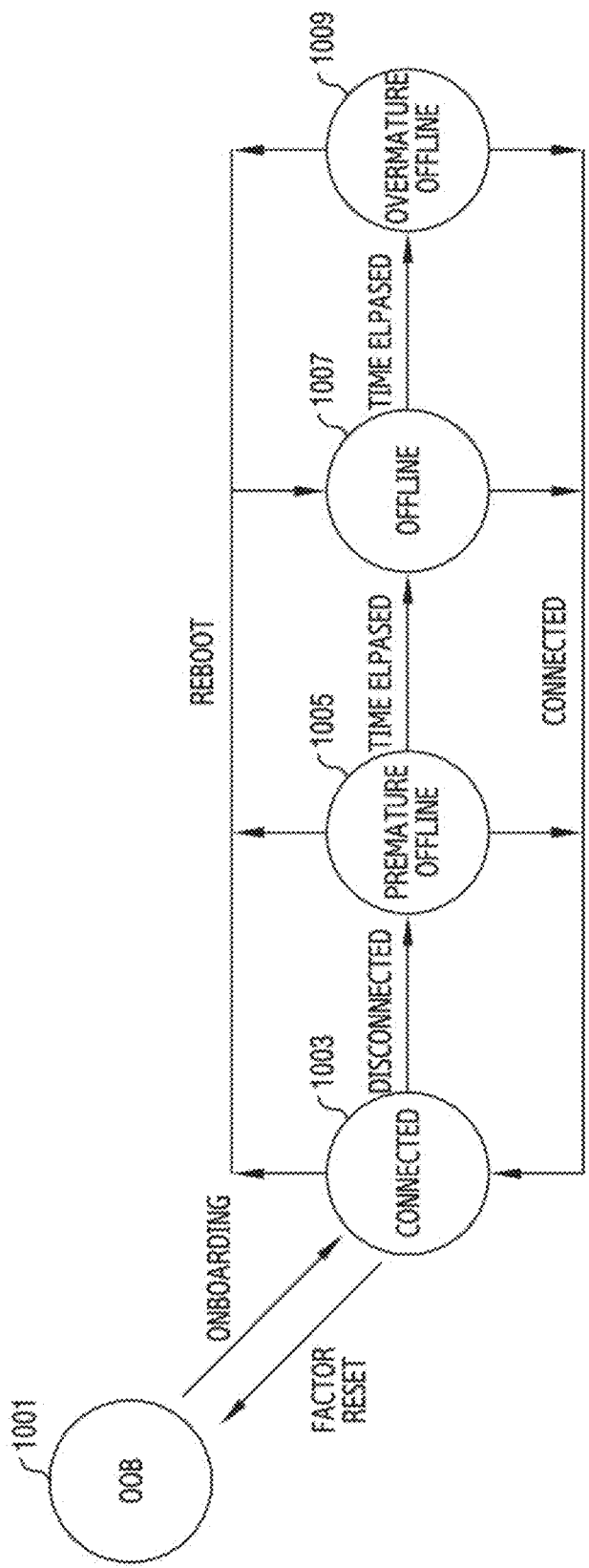
FIG. 10 is a view illustrating an example state determination criterion of a second device according to an embodiment.

FIG. 10 illustrates example criterion for determining a state of the second device according to an embodiment.

Referring to FIG. 10, the second device 202 may change its state to out of box (OOB) 1001, connected 1003, premature offline 1005, offline 1007, or overmature offline 1009 according to a system setup, whether the second device 202 is connected with the first device 201, and/or an elapsed time after disconnection.

In an embodiment, the OOB 1001 refers to a state before a system setup is completed after a product box of the second device 202 is opened for the first time. The second device 202 in the OOB 1001 state may be connected with the first device 201 through an onboarding procedure, and may be registered at the server 300. In addition, the second device 202 may be changed back to the OOB 1001 through a factory reset even when the system setup is completed.

In an embodiment, the connected 1003 may refer to a state in which the second device 202 establishes a short-range communication channel with the first device 201 and is connected. The second device 202 may identify the first device 201 by using a public key registered at the server 300 in the onboarding procedure, and may establish a connection. For example, the second device 202 in the connected 1003 state may perform communication with the first device 201 based on a generic attributed profile (GATT) connection. In addition, when a connection with the first device 201 is established in the premature offline 1005, offline 1007, and overmature offline 1009 state, the second device 202 may immediately switch to the connected 1003 state.

In an embodiment, the premature offline 1005 may refer to a state before a first time (for example, 15 minutes) is elapsed after the second device 202 is disconnected from the first device 201. The second device 202 may not immediately switch to the offline 1007 state after being disconnected from the first device 210, and may maintain the premature offline 1005 state for the first time.

In an embodiment, the offline 1007 may refer to a state after the first time is elapsed after the second device 202 is disconnected from the first device 201. The second device 202 may switch to the offline 1007 state when the first time (for example, 15 minutes) is elapsed after the second device 202 enters the premature offline 1005 state, and then, may maintain the offline 1007 state before a second time (for example, 24 hours) is more elapsed. When system rebooting starts in the connected 1003, the premature offline 1005, and the overmature offline 1009 state, the second device 202 may switch to the offline 1007 state. Regarding the first time and the second time, various determination criteria may be applied according to user setting or criteria of a manufacturer.

In an embodiment, the overmature offline 1009 may refer to a state after the second time (for example, 24 hours) is elapsed after the second device 202 enters the offline 1007 state. The second device 202 in the overmature offline 1009 state may determine that it is lost, and may broadcast an advertising packet including identification information of the second device 202 to electronic devices located within a predetermined distance.

Figure 11:
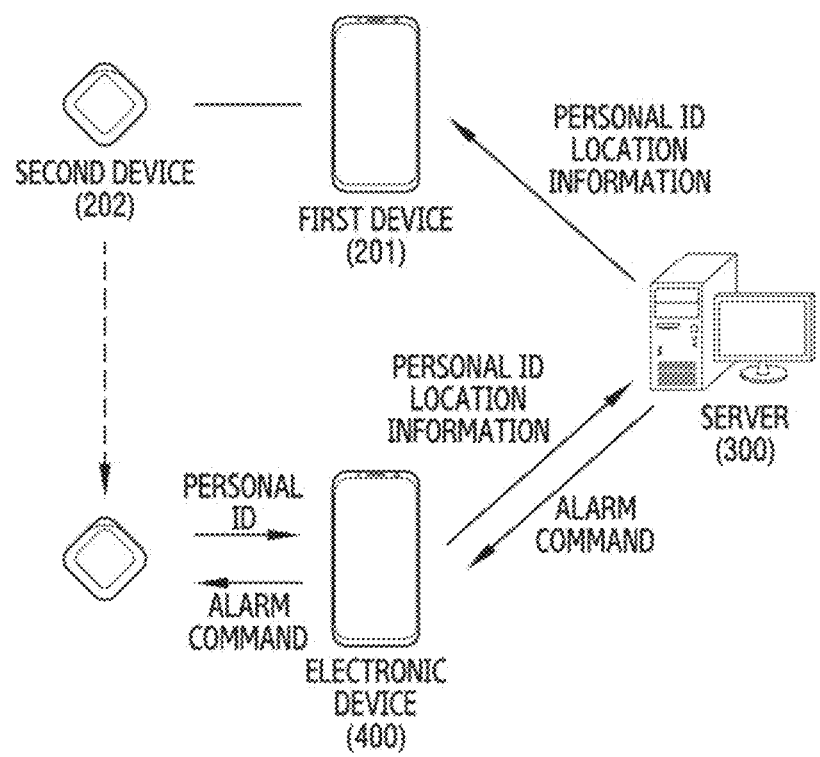
FIG. 11 is a view illustrating a concept providing an alarm of a second device in an example system which identifies a location of a user device according to an embodiment.

FIG. 11 is a view illustrating an example concept of providing an alarm of a second device in a system for identifying a location of a user device according to an embodiment.

The system according to an embodiment may include a first device 201, a second device 202, a server 300, and an electronic device 400, and may be understood as the same as the system of FIGS. 2 and 6. The first device 201 and the second device 202 are user device sharing the same user account, and may be connected with each other through a short-range network. FIG. 1 illustrates a state in which the second device 202 is disconnected from the first device 201 and then enters an overmature offline state. According various embodiments, it may be assumed that a user of the first device 201 has placed the second device 202 in the pocket or among belongings of a third user, in order to secretly track a location of the third user. The server 300 may identify the location of the second device 202 which is in a lost or overmature offline state. The electronic device 400 may have no association with the user of the first device 201, and may be understood as a device that is located within a distance in which it is possible to receive a packet broadcasted from the second device 202.

In an embodiment, the second device 202 in the overmature offline state may broadcast a packet containing a variety of information including its own identification information (for example, a personal ID). The packet may be broadcasted to be received by electronic devices which are located within a predetermined communicable distance. According to another embodiment, the second device 202 may iteratively broadcast the packet periodically according to a designated time or for a predetermined time, based on user' setting.

In an embodiment, the electronic device 400 may receive the packet broadcasted by the second device 202, and may measure its location by using a location measurement circuit (for example, a GPS circuit). It may be estimated that the electronic device 400 which receives the packet is located at a distance close to the second device 202, and the location of the electronic device 400 may be regarded as being the same as the location of the second device 202.

In an embodiment, the electronic device 400 may transmit the measured location information and the identification information of the second device 202 to the server 300 by using a long-range network (for example, cellular communication). According to various embodiments, the electronic device 400 may also transmit the packet received from the second device 202 to the server 300.

In an embodiment, when the server 300 acquires a message including the identification information of the second device 202 and the location information from the electronic device 400, the server 300 may update and manage recent location of the second device 202. For example, the server 300 may transmit the identification information of the second device 202 and the location information to the first device 201 which is registered as sharing the same user account with the second device 202.

In an embodiment, the server 300 may transmit an alarm command to the electronic device 400, which provides the identification information of the second device 202 and the location information, in order to more easily find the second device 202 in the overmature offline state. For example, the server 300 may determine whether to generate an alarm in the second device 202, by considering conditions such as whether location information of the second device 202 is changed, a receiving period of location information of the second device 202, identification information of the electronic device 400 which transmits the location information of the second device 202, and/or a history of generating an alarm in the second device 202. In another example, in case that the user of the first device 201 secretly puts the second device 202 in belongings of the third user with a malicious intention, it may be determined whether to generate the alarm by considering whether location information is received from the same electronic device when a predetermined time is elapsed after the alarm is generated in the second device 202. When it is determined to generate the alarm in the second device 202 as a result of determining, the server 300 may transmit an alarm command including an alarm state control value and a volume level to be set for the second device 202 to the electronic device 400.

In an embodiment, the electronic device 400 may transmit the alarm command received from the server 300 to the second device 202. For example, when the electronic device 400 receives the alarm command from the server 300, the electronic device 400 may request a confirmation regarding the generation of the alarm in the second device 202 from a user of the electronic device 400 through a user interface (UI), in order to prevent an alarm from being generated in an inappropriate situation. According to various embodiments, before the electronic device 400 transmits the alarm command to the second device 202, an authentication procedure between the electronic device 400 and the second device 202 may be performed. In addition, the electronic device 400 may encrypt the alarm command and may transmit the encrypted alarm command to the second device 202.

In an embodiment, the second device 202 may generate an alarm in the form of an audio signal, based on the alarm command received from the electronic device 400, and accordingly, people located in the proximity of the second device 202 could follow the output audio signal to the exact location of the second device 202. According to various embodiments, the second device 202 may be provided with an input means, such as a physical button. For example, a person who located the second device 202 by following the output may terminate output of the alarm through the input means, and a notification thereabout may be transmitted to the electronic device 400 or the server 300.

Figure 12:
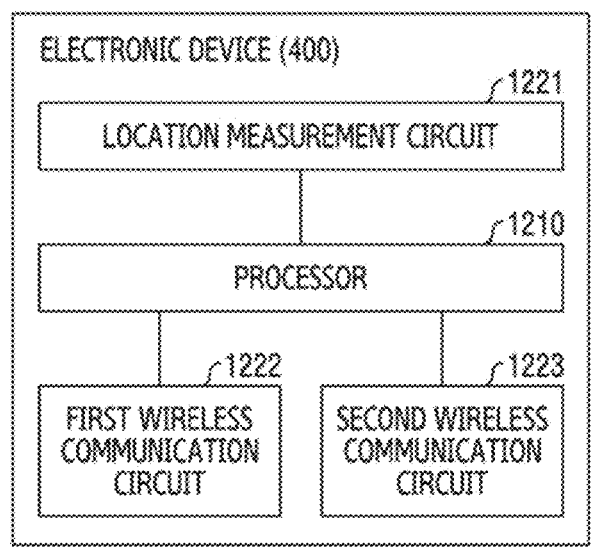
FIG. 12 is a view illustrating example hardware elements of an electronic device according to an embodiment.

FIG. 12 illustrates hardware elements of an electronic device according to an embodiment.

Referring to FIG. 12, the electronic device 400 may include a location measurement circuit 1221, a first wireless communication circuit 1222, a second wireless communication circuit 1223, and at least one processor 1210 electrically and/or operatively connected with these elements. The electronic device 400 of FIG. 12 may be located within a predetermined communicable distance from the second device 202, and is registered at the server 300 based on a user account different from the second device 202.

In various embodiments, descriptions of the electronic device 101 of FIG. 1 and the electronic device 400 of FIG. 2 may be applied to the electronic device 400, which will be described below with reference to FIGS. 11 to 15. For example, the processor 1210 of the electronic device 400 may correspond to the processor 120 of FIG. 1. In addition, the location measurement circuit 1221, the first wireless communication circuit 1222, and the second wireless communication circuit 1223 of the electronic device 400 may correspond to the communication module 190 or the wireless communication module 192 of FIG. 1. In addition, descriptions of the electronic device 101 of FIG. 1 may be appropriately applied to the electronic device 400.

In an embodiment, the at least one processor 1210 may receive an advertising packet including identification information of an external device from the external device using the first wireless communication circuit 1222. The first wireless communication circuit 1222 may be a short-range communication circuit supporting Bluetooth communication and/or BLE communication. The external device may be a device that corresponds to the second device 202, as explained in FIGS. 2 to 11, and may be understood as entering an overmature offline state, in which a predetermined time has elapsed after disconnection of the external device from the first device 201, which uses the same user account as that of the external device. For example, the at least one processor 1210 may receive the advertising packet broadcasted by the external device in the overmature offline state, using the first wireless communication circuit 1222.

In an embodiment, the at least one processor 1210 may acquire location information of the electronic device 400 using the location measurement circuit 1221. For example, the location measurement circuit 1221 may include GPS circuitry. Since the electronic device 400 receiving the advertising packet from the external device indicates that the electronic device 400 is located within a distance in which short-range communication with the external device is possible, the location information measured by using the location measurement circuit 1221 may be regarded as being the same as a location of the external device.

In an embodiment, the at least one processor 1210 may transmit a first signal including identification information of the external device and the location information to the server 300 by using the second wireless communication circuit 1223. The second wireless communication circuit 1223 may be a long-range communication circuit supporting cellular or Wi-Fi. The server 300 is a device that corresponds to the server 108 of FIG. 1 or the server 300 explained in FIGS. 2 to 11, and may provide a user account and/or a location identification service for an electronic device (for example, the second device 202) in an overmature offline state.

In an embodiment, the at least one processor 1210 may receive a second signal including an alarm command regarding the external device from the server 300 by using the second wireless communication circuit 1223. The server 300 may determine whether to generate an alarm in the external device. For example, the server 300 may determine whether to generate an alarm in the external device, by considering conditions, such as whether location information of the external device is changed, a receiving period of location information of the external device, identification information of the electronic device 400, and/or a history of generating an alarm in the external device. When it is determined to generate an alarm in the external device, the server 300 may generate an alarm command including an alarm state control value and a volume level to be set for the external device, and may transmit the alarm command to the electronic device 400.

According to various embodiments, when the at least one processor 1210 receives the alarm command regarding the external device from the server 300, an authentication procedure between the electronic device 400 and the external device may be performed. For example, in response to the alarm command being received from the server 300, the at least one processor 1210 may acquire authentication data from the external device, and may transmit a request for encrypting the acquired authentication data to the server 300. The authentication data may include at least one of data (for example, the personal ID 904 of FIG. 9) included in each field of the advertising packet, nonce which is an ephemeral random value read from the external device, or a text for authenticating. The text for authenticating may be defined beforehand (for example, at a time when the external device is registered at the server 300 by a mother terminal), and may be shared between the external device and the server 300. The at least one processor 1210 may acquire encrypted authentication data and a one-time session key from the server 300 in response to the request for encrypting. For example, when the request for encrypting the authentication data is received from the electronic device 400, the server 300 may identify the external device by using the personal ID included in the authentication data, and may encrypt the authentication data by using a key shared between the identified external device and the server 300, and then may transmit the encrypted authentication data to the electronic device 400. The encrypted authentication data may be transmitted to the external device through the first wireless communication circuit 1222. When the authentication procedure is successfully performed, the at least one processor 120 may encrypt the alarm command by using the one-time session key. For example, the external device may compare the encrypted authentication data, received from the electronic device 400, with authentication data calculated by the external device, and, when the data match each other as the result of comparing, the external device may determine that the authentication procedure is successfully performed. According to various embodiments, the external device may encrypt and decrypt the authentication data by using a symmetric key method or an asymmetric key method. For example, when the symmetric key method is used, the external device may determine whether the authentication procedure succeeds, by comparing the received encrypted authentication data and the authentication data encrypted by the external device. In another example, when the asymmetric key method is used, the external device may decrypt the received encrypted data with a private key, and may determine whether the authentication procedure succeeds by comparing the decrypted authentication data and the authentication data generated by the external device.

According to various embodiments, the at least one processor 1210 may display a user interface (hereinafter, a UI) for identifying whether to execute the alarm command through a display (not shown), in order to prevent the alarm from being generated when the user does not want. In this case, the at least one processor 1210 may determine whether to execute the alarm command, based on a response received through the UI. For example, when a response for agreeing with execution of the alarm command is received from the UI, the at least one processor 1210 may transmit the alarm command to the external device. In another example, when a response for refusing to execute the alarm command is received from the UI, the at least one processor 1210 may not transmit the alarm command to the external device, and may discard the alarm command.

In an embodiment, the at least one processor 1210 may transmit the encrypted alarm command to the external device by using the first wireless communication circuit 1222. The external device may generate an alarm in the form of an audio signal, such as a buzzer-like tone, based on the alarm command received from the electronic device 400.

Figure 13:
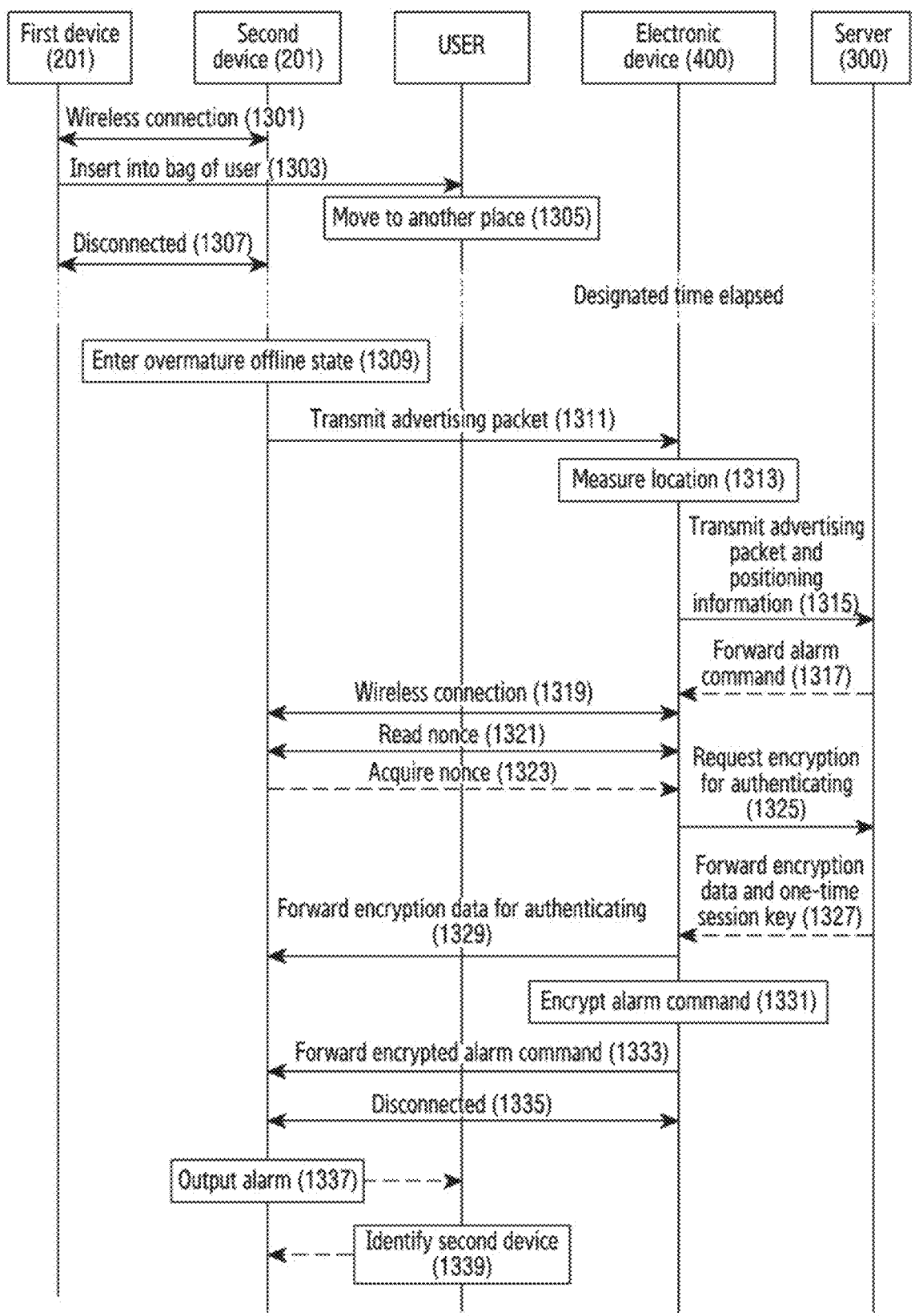
FIG. 13 is a flowchart illustrating an example process of generating an alarm in a second device based on an alarm command according to an embodiment.

FIG. 13 is a flowchart illustrating an example process of generating an alarm in a second device based on an alarm command according to an embodiment.

Referring to FIG. 13, in operation 1301, a wireless communication connection may be established between the first device 201 and the second device 202. The first device 201 and the second device 202 may be devices that are registered at the server 300 by using the same user account. Thereafter, in operation 1303, a user of the first device 201 may, for example, insert the second device 202 in a bag of another user, and in operation 1305, the user may move to another location.

According to an embodiment, in operation 1307, the wireless communication connection established between the first device 201 and the second device 202 may be broken. For example, when a distance between the first device 201 and the second device 202 exceeds a predetermined distance in which wireless communication is possible, or if data exchange is not performed between the two devices for longer than a predesignated time, the wireless communication connection may be broken. In another example, the wireless communication connection may be broken by a physical manipulation on the first device 201 and/or the second device 202 or user setting.

According to an embodiment, when a designated time (for example, 24 hours or more) has elapsed after the connection between the first device 201 and the second device 202 is broken, the second device 202 may recognize that it is lost, and may enter an overmature offline state, as in operation 1309.

According to an embodiment, in operation 1311, the second device 202 may broadcast an advertising packet including its own identification information. The advertising packet may be received by the electronic device 400 which is located within a predetermined distance in which wireless communication with the second device 202 is possible. According to various embodiments, the second device 202 may iteratively broadcast the advertising packet at designated time intervals or for a predetermined time.

According to an embodiment, in operation 1313, the electronic device 400 which receives the advertising packet may measure its location information. Since the electronic device 400 is located at a sufficiently close distance permitting wireless communication with the second device 202, positioning information of the electronic device 400 may be understood as being the same as location information of the second device 202.

According to an embodiment, in operation 1315, the electronic device 400 may transmit identification information of the second device 202 and the positioning information to the server 300. According to various embodiments, the electronic device 400 may rebroadcast the advertising packet of the second device 202 or a packet including at least a part of data of the advertising packet.

According to an embodiment, in operation 1317, the server 300 may determine whether to generate an alarm regarding the second device 202 in the overmature offline state, and, when it is determined to generate the alarm, the server may generate an alarm command and transmit the alarm command to the electronic device 400. The alarm command may include an alarm state control value and a volume level for the second device 202. According to various embodiments, the server 300 may determine whether to generate the alarm in the second device 202, by considering conditions, such as whether location information of the second device 202 is changed, a receiving period of location information of the second device 202, identification information of the electronic device 400 which transmits the location information of the second device 202, and/or a history of generating an alarm in the second device 202. For example, when the location information of the second device 202 is changed and location information is iteratively received from the same electronic device within a predetermined time after the alarm is generated in the second device 202, the server 300 may recognize that malicious location tracking by using the second device 202 is ongoing, or recognize that the second device 202 is lost for a long time, and may determine that to generate an alarm in the second device 202.

According to an embodiment, the electronic device 400 which receives the alarm command regarding the second device 202 from the server 300 may establish a wireless communication connection with the second device 202 in operation 1319. The wireless communication connection may be established by using a short-range communication network.

According to an embodiment, in operation 1321, the electronic device 400 may read nonce and authentication data for performing an authentication procedure from the second device 202 through the wireless communication connection. For example, the nonce may be a random value that is generated in the second device 202 according to a predetermined random number algorithm. In operation 1323, the electronic device 400 may acquire the nonce and the authentication data from the second device 202, and in operation 1325, the electronic device 400 may forward the nonce and the authentication data acquired from the second device 202 to the server 300, and may request encryption for authenticating.

According to an embodiment, in operation 1327, the server 300 may generate encrypted authentication data by encrypting the authentication data with the nonce and an authentication key, in response to the encryption request, and may generate a command key by using the authentication key and the nonce. The authentication key (non-owner BLE authentication key (NBAK)) may be generated in common at the server 300 and the second device 202 by using a key derivation function (KDF) defined in the American National Standards Institute (ANSI) x9.63. In addition, the command key (non-owner command key (NCK)) may be a one-time session key that is generated in common at the server 300 and the second device 202 by using the KDF defined by the ANSI x9.63 in every authentication procedure. The server 300 may deliver the encrypted authentication data and the generated command key to the electronic device 400.

According to an embodiment, in operation 1329, the electronic device 400 may forward the encrypted authentication data, received from the server 300, to the second device 202 to authenticate the device. The second device 202 may perform device authentication for the electronic device 400 by comparing the encrypted authentication data received from the electronic device 400 and authentication data calculated by the second device 202. For example, when the encrypted authentication data is the same as the calculated authentication data as the result of comparing, it may be determined that the authentication of the electronic device 400 succeeds, and the wireless communication connection between the second device 202 and the electronic device 400 may be maintained. When the encrypted authentication data is different from the calculated authentication data as the result of comparing, it may be determined that the authentication of the electronic device 400 fails, and the wireless communication connection between the second device 202 and the electronic device 400 may be broken, and the corresponding process may be finished.

According to an embodiment, the electronic device 400, when successful in the device authentication attempt, may encrypt the alarm command to verify the creditability of the alarm command regarding the second device 202 in operation 1331. For example, the electronic device 400 may encrypt the alarm command using the command key received from the server 300 before.

According to an embodiment, in operation 1333, the electronic device 400 may transmit the encrypted alarm command to the second device 202 using the wireless communication connection. After the encrypted alarm command is transmitted, the connection between the second device 202 and the electronic device 400 may be broken in operation 1335.

According to an embodiment, in operation 1337, the second device 202 may output an alarm in the form of an audio signal in response reception of the encrypted alarm command. In addition, in operation 1339, the user located in the proximity of the second device 202 may easily and quickly identify the location of the second device 202, based on the alarm. The user may generate an input through an input circuitry provided on the second device 202, which may terminate the alarm output. The input circuitry may include a button which enables a single click, a double click, or a touch to a touch-sensitive panel or display.

Figure 14:
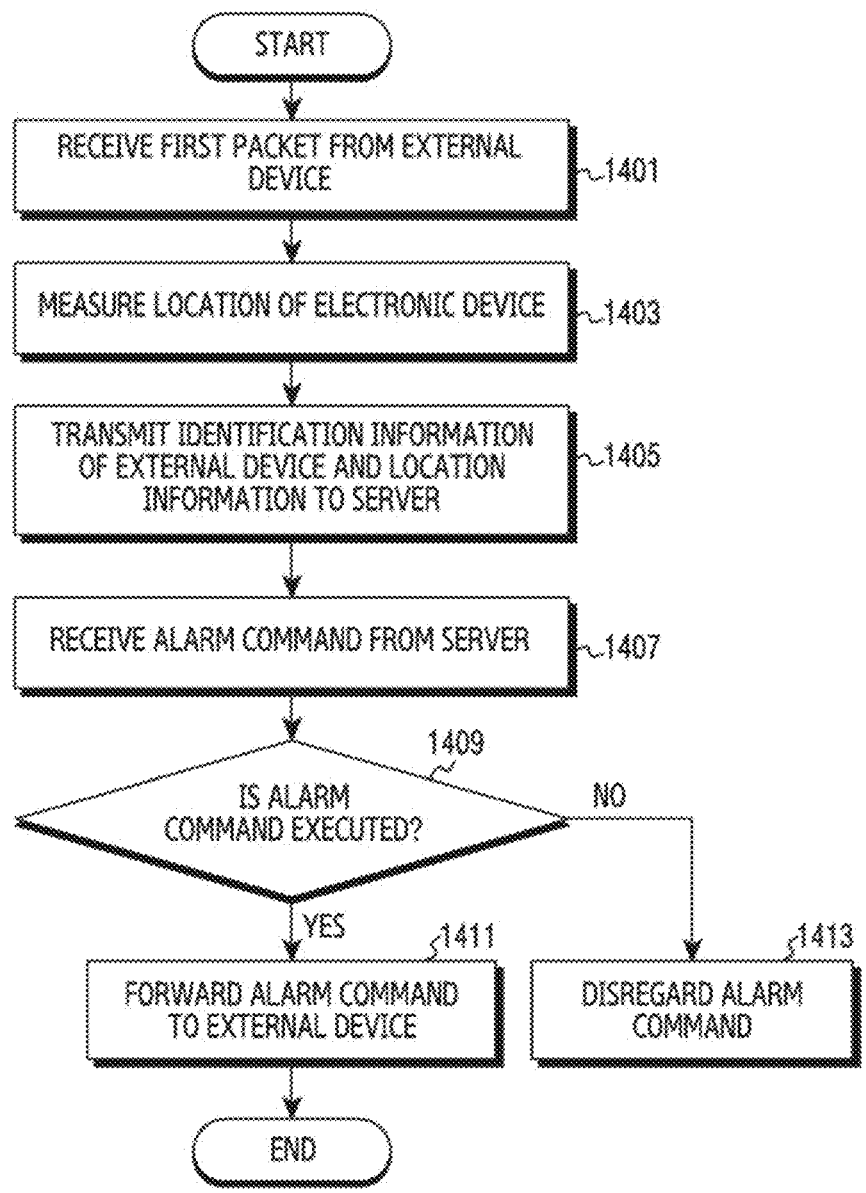
FIG. 14 is a flowchart illustrating an example process in an electronic device operating based on reception of an advertising packet according to an embodiment.

FIG. 14 is a flowchart of an operation of an electronic device according to reception of an advertising packet according to an embodiment.

Referring to FIG. 14, in operation 1401, the electronic device 400 may receive a first packet from an external device (for example, the second device 202) using the first wireless communication circuit 1222. The first wireless communication circuit 1222 may be a short-range communication circuit that supports Bluetooth command and/or BLE communication. The first packet may be an advertising packet that is broadcasted by the external device which is in an overmature offline state, and may include identification information of the external device.

According to an embodiment, in operation 1403, the electronic device 400 may detect a present location by using the location measurement circuit 1221. Since the electronic device 400 receiving the first packet from the external device indicates that the electronic device 400 is located within a certain distance enabling performance of short-range communication with the external device, the location information measured at the electronic device 400 may be regarded as being the same as location information of the external device. The location measurement circuit 1221 may include a GPS circuit.

According to an embodiment, in operation 1405, the electronic device 400 may transmit identification information and the location information of the external device to the server 300 using the second wireless communication circuit 1223. The second wireless communication circuit 1223 may include a long-range communication circuit that supports cellular or Wi-Fi.

According to an embodiment, in operation 1407, the electronic device 400 may receive an alarm command on the external device from the server 300 using the second wireless communication circuit 1223. It may be determined whether to generate an alarm in the external device through the server 300. For example, the server 300 may determine whether to generate an alarm in the external device, by considering conditions such as whether location information of the external device is changed, a receiving period of location information of the external device, identification information of the electronic device 400, and/or a history of generating an alarm in the external device. When it is determined to generate the alarm of the external device, the server 300 may generate an alarm command including an alarm state control value and a volume level for the external device, and may transmit the alarm command to the electronic device 400.

According to an embodiment, in operation 1409, the electronic device 400 may determine whether to execute the alarm command regarding the external device, which is received from the server 300, in order to prevent the alarm command from being executed in an inappropriate environment or situation. For example, the electronic device 400 may display a UI on the display, the UI including an element selectable to execute the alarm command. The UI element selectable to execute the alarm command may be provided as shown in FIG. 15.

According to various embodiments, when a user input is received confirming execution of the alarm command through the UI (Yes in operation 1409), the electronic device 400 may transmit the alarm command to the external device in operation 1411. Before transmitting the alarm command to the external device, the electronic device 400 may perform authentication and encrypt the alarm command to verify creditability in the alarm command generation process. The external device may generate an alarm in the form of an audio signal based on the alarm command. In addition, when a response for refusing to execute the alarm command is received from the UI (No in operation 1409), the electronic device 400 may disregard the alarm command in operation 1413 and may finish the corresponding process.

Figure 15:
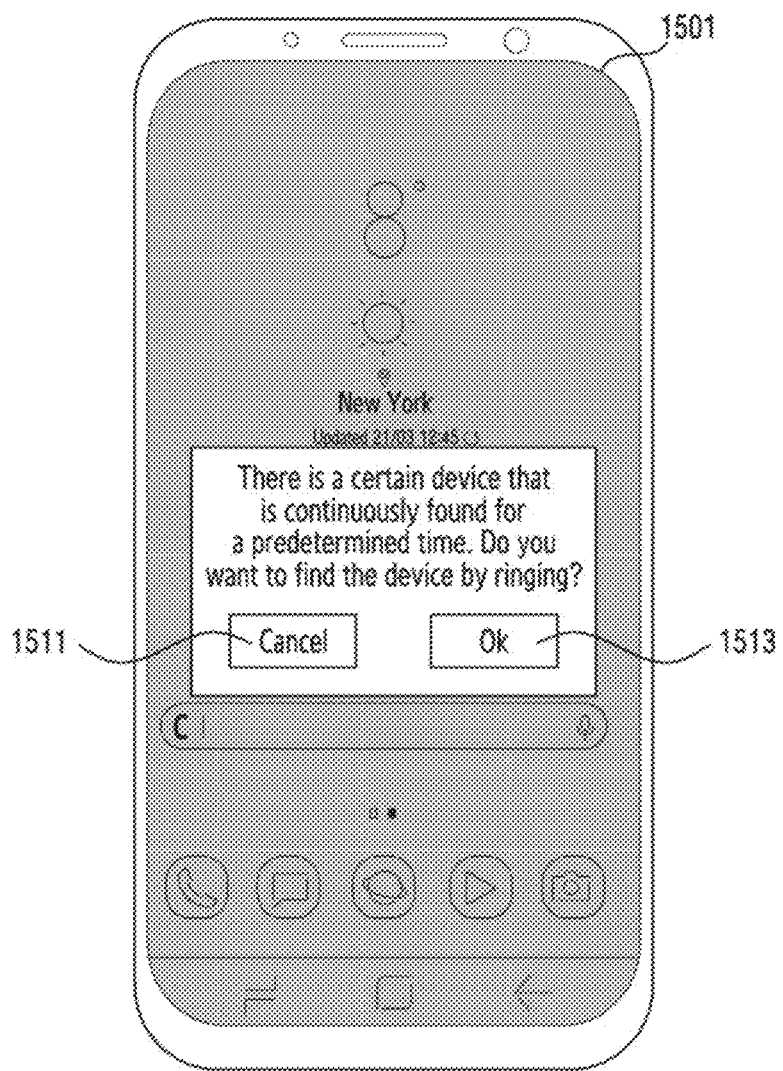
FIG. 15 is a view illustrating an example user interface for identifying whether an alarm of a second device is outputted in an electronic device according to an embodiment.

FIG. 15 illustrates a UI for identifying whether to output an alarm of a second device in an electronic device according to an embodiment.

Referring to FIG. 15, the electronic device 400 may receive an alarm command for an external device (for example, the second device 202) from the server 300 while displaying a first screen 1501 on the display. The first screen 1501 may be a screen of an application which is executing in the electronic device 400.

In an embodiment, the electronic device 400 may display a UI for confirming whether to execute the alarm command through the display, in order to prevent output of the alarm by the external device in an inappropriate environment or situation. For example, the UI may be generated as a floating window including a text and/or an image, inquiring whether to execute the alarm command, and may be displayed on the first screen 1501, which in some examples may include overlapping other display elements.

When a cancel button 1511 is selected through the UI shown in FIG. 15, the electronic device 400 may recognize that execution of the alarm command has been rejected by a user, and no alarm command will be transmitted to the external device. Accordingly, the alarm command may be discarded. In another example, when a confirmation button 1513 is selected through the UI (e.g., OK), the electronic device 400 may detect that execution of the alarm command has been requested by the user, and may transmit the alarm command to the external device. It should be appreciated that the UI of FIG. 15 is presented as a non-limiting example, and it is understood that the UI may be configured variously, according to a manufacturer design or user's preferences and settings.

According to an embodiment, an electronic device may include: a location detection circuit; a first wireless communication circuit configured to support short-range communication; a second wireless communication circuit; and at least one processor electrically connected with the location detection circuit, the first wireless communication circuit, and the second wireless communication circuit, and the at least one processor may be configured to: receive an advertising packet including identification information of an external device from the external device using the first wireless communication circuit; acquire a location of the electronic device using the location measurement circuit; transmit a first signal including the identification information of the external device and the acquired location to a server using the second wireless communication circuit; receive a second signal including an alarm command for the external device from the server by using the second wireless communication circuit; and transmit the alarm command to the external device by using the first wireless communication circuit.

In an embodiment, the short-range communication may include Bluetooth low energy (BLE).

In an embodiment, the second wireless communication circuit may support one or more of a cellular network or a Wi-Fi network.

In an embodiment, the electronic device may further comprise a display, and the at least one processor may display a user interface (UI) selectable to indicate whether to execute the alarm command on the display, and may transmit the alarm command to the external device based on a response input received through the UI.

In an embodiment, the at least one processor may execute authentication between the electronic device and the external device, and, based on detecting the authentication is successful, may encrypt the alarm command and transmit the encrypted alarm command to the external device.

In an embodiment, the at least one processor may acquire authentication data from the external device based on detecting reception of the alarm command from the server, and may transmit an encryption request for the acquired authentication data to the server.

In an embodiment, the at least one processor may acquire encrypted authentication data and a one-time session key from the server after transmitting the encryption request to the server, and may transmit the encrypted authentication data to the external device.

In an embodiment, the at least one processor may encrypt the alarm command using the one-time session key, and may transmit the encrypted alarm command to the external device.

In an embodiment, the location measurement circuit may include a global positioning satellite (GPS) circuit.

In an embodiment, the alarm command may include an alarm state control value and a volume level for the external device.

According to another embodiment, an operating method of an electronic device may comprise: receiving an advertising packet including identification information of an external device from the external device using a first wireless communication; acquiring a location of the electronic device using a location detection circuit; transmitting a first signal including the identification information of the external device and the location to a server using a second wireless communication circuit of the electronic device; receiving a second signal including an alarm command for the external device from the server via the second wireless communication circuit; and transmitting the alarm command to the external device using the first wireless communication circuit.

In an embodiment, transmitting the alarm command to the external device may comprise: displaying a user interface (UI) selectable to indicate whether to execute the alarm command on a display of the electronic device; and transmitting the alarm command to the external device, based on a response input received through the UI.

In an embodiment, transmitting the alarm command to the external device may comprise: executing authentication between the electronic device and the external device; and, based on detecting the authentication is successful, encrypting the alarm command and transmitting the encrypted alarm command to the external device.

In an embodiment, performing the authentication between the electronic device and the external device may comprise: acquiring authentication data from the external device based on detecting reception of the alarm command from the server; and transmitting an encryption request for the acquired authentication data to the server.

In an embodiment, performing the authentication between the electronic device and the external device may comprise: acquiring encrypted authentication data and a one-time session key from the server based on detecting the encryption request; and transmitting the encrypted authentication data to the external device.

In an embodiment, the method may further comprise: encrypting the alarm command using the one-time session key; and transmitting the encrypted alarm command to the external device.

In an embodiment, the alarm command may include an alarm state control value and a volume level for the external device.

According to another embodiment, an electronic device may include: one or more memory modules; at least one sensor; a first wireless communication circuit and a second wireless communication circuit configured to support communication with a heterogenous network; and at least one processor electrically connected with the one or more memory modules, the at least one sensor, the first wireless communication circuit and the second wireless communication circuit, and one or more memory modules may store instructions that, when executed, cause the at least one processor to: receive an advertising packet including identification information of an external device from the external device, and to control the first wireless communication circuit to transmit alarm information to the external device; control the at least one sensor to acquire a location of the electronic device; and control the second wireless communication circuit to transmit a first signal including the identification information of the external device and the location to a server, and to control the second wireless communication circuit to receive a second signal including an alarm command regarding the external device from the server in response to the first signal.

In an embodiment, the instructions may cause the at least one processor to: control the first wireless communication circuit to acquire authentication data from the external device based on reception of the second signal from the server; control the second wireless communication circuit to transmit an encryption request for the acquired authentication data to the server, and to acquire encrypted authentication data and a one-time session key from the server responsive to the encryption request; and control the first wireless communication circuit to transmit, to the external device, the encrypted authentication data and the alarm command encrypted using one-time session key.

In an embodiment, the electronic device may further comprise a display module, and the instructions may cause the at least one processor to: control the display module to display a user interface (UI) selectable to indicate whether to execute the alarm command; and control the first wireless communication circuit to transmit the alarm information to the external device, based on a response input received through the UI.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server. According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The invention claimed is:

1. An electronic device, comprising:
a display;
global positioning system (GPS) circuitry;
first wireless communication circuitry for supporting short-range wireless communication with a first external device;
second wireless communication circuitry for supporting long-range wireless communication with a server;
a processor including processing circuitry; and
memory storing instructions that, when executed by the processor, cause the electronic device to:
receive an advertising packet including identification information of the first external device from the first external device, which is disconnected from a second external device,
in response to receiving the advertising packet, transmit, to the server, location information of the electronic device obtained by the GPS circuitry and the identification information of the first external device,
display, on the display, a user interface (UI) to notify that the first external device is continuously found with the electronic device based on information received from the server,
receive, through the UI, a user input for the first external device to output an alarm sound, and in response to receiving the user input, transmit, to the first external device, a command for the first external device to output the alarm sound, wherein the first external device and the second external device are associated with a first user account different from a second user account associated with the electronic device.

2. The electronic device of claim 1, wherein the first wireless communication is configured to support one or more of Bluetooth communication or Bluetooth low energy (BLE) communication.

3. The electronic device of claim 1, wherein the second wireless communication circuitry is configured to support one or more of a cellular network or a Wi-Fi network.

4. The electronic device of claim 1, wherein when a distance between the first external device and the second external device exceeds a predetermined distance in which the short-range wireless communication is possible, or when data exchange is not performed between the first external device and the second external device for longer than a predesignated time, the first external device is considered to be disconnected from the second external device.

5. The electronic device of claim 1, wherein the information received from the server includes information to allow the electronic device to transmit, to the first external device, the command for the first external device to output the alarm sound.

6. The electronic device of claim 5, wherein the electronic device receives the information from the server when the electronic device continuously transmits, to the server, the location information of the electronic device and the identification information of the first external device, and the location information of the electronic device is changed over time.

7. A server, comprising:
an account manager configured to manage a first user account and a second user account registered at the server and different from each other, wherein the first user account is associated with an electronic device and the second user account is associated with a first external device; and an alarm setting manager configured to determine whether to generate and send an alarm signal to the electronic device depending on whether information received from the electronic device meets a predetermined condition, wherein the information received from the electronic device includes identification information of the first external device and location information of the electronic device including latitude and longitude coordinates, wherein the alarm signal includes information to allow the electronic device to transmit, to the first external device, a command for the first external device to output an alarm sound, wherein the account manager and the alarm setting manager are implemented using one or more processors and one or more storage devices.

8. The server of claim 7, wherein the predetermined condition is met when the server periodically receives from the electronic device the identification information of the first external device and the location information of the electronic device, and the location information of the electronic device is changed over time.

9. The server of claim 8, wherein the alarm setting manager determines whether to generate and send the alarm signal to the electronic device additionally depending on whether the server receives information that a second external device sharing the first user account with the first external device is disconnected from the first external device.

10. The server of claim 9, wherein when a distance between the first external device and the second external device exceeds a predetermined distance in which a short-range wireless communication is possible, or when data exchange is not performed between the first external device and the second external device for longer than a predesignated time, the second external device is considered to be disconnected from the first external device.

11. A system, comprising:
an electronic device; and
a server configured to communicate with the electronic device through a long-range wireless communication network, wherein the electronic device is configured to receive from a first external device an advertising packet including identification information of the first external device through a short-range wireless communication network, and transmit, to the server, information including location information of the electronic device obtained by GPS circuitry and the identification information of the first external device, wherein the server configured to register a first user account associated with the electronic device and a second user account associated with the first external device and different from the first user account, and generate and send an alarm signal to the electronic device based on determination that the information received from the electronic device meets a predetermined condition, wherein the electronic device is further configured to display a UI to notify that the first external device is continuously found with the electronic device based on the alarm signal received from the server, and transmit, to the first external device, a command for the first external device to output an alarm sound in response to a user input for the first external device to output the alarm sound through the UI.

12. The system of claim 11, wherein the predetermined condition is met when the server periodically receives from the electronic device the identification information of the first external device and the location information of the electronic device, and the location information of the electronic device is changed over time.

13. The system of claim 12, wherein the server is configured to generate and send the alarm signal to the electronic device additionally depending on whether the server receives information that a second external device sharing the second user account with the first external device is disconnected from the first external device.

14. The electronic device of claim 11, wherein the alarm signal received from the server includes information to allow the electronic device to transmit, to the first external device, the command for the first external device to output the alarm sound.

15. An electronic device, comprising:
a display;
global positioning system (GPS) circuitry;
first wireless communication circuitry for supporting short-range wireless communication with a first external device;
second wireless communication circuitry for supporting long-range wireless communication with a server;
a processor including processing circuitry; and memory storing instructions that, when executed by the processor, cause the electronic device to:

receive an advertising packet including identification information of the first external device from the first external device, which is disconnected from a second external device, based on receiving the advertising packet, transmit, to the server, location information of the electronic device obtained by the GPS circuitry and the identification information of the first external device, display, on the display, a user interface (UI) to notify that the first external device is continuously found with the electronic device, allow to receive a user input for the first external device to output an alarm sound, in response to receiving the user input, transmit, to the first external device, a command for the first external device to output the alarm sound, and wherein the first external device and the second external device are associated with a first user account different from a second user account associated with the electronic device.

16. The electronic device of claim 15, wherein the first wireless communication is configured to support one or more of Bluetooth communication or Bluetooth low energy (BLE) communication.

17. The electronic device of claim 15, wherein the second wireless communication circuitry is configured to support one or more of a cellular network or a Wi-Fi network.

18. The electronic device of claim 15, wherein when a distance between the first external device and the second external device exceeds a predetermined distance in which the short-range wireless communication is possible, or when data exchange is not performed between the first external device and the second external device for longer than a predesignated time, the first external device is considered to be disconnected from the second external device.

19. The electronic device of claim 15, wherein the information received from the server includes information to allow the electronic device to transmit, to the first external device, the command for the first external device to output the alarm sound.

20. The electronic device of claim 19, wherein the electronic device receives the information from the server when the electronic device continuously transmits, to the server, the location information of the electronic device and the identification information of the first external device, and the location information of the electronic device is changed over time.

21. The electronic device of claim 15, wherein the user interface (UI) is displayed based on information received from the server, the UI including an element selectable to output the alarm sound.

* * * * *